US009563279B2

(12) United States Patent
Seo et al.

(10) Patent No.: US 9,563,279 B2
(45) Date of Patent: Feb. 7, 2017

(54) FLEXIBLE APPARATUS AND CONTROL METHOD THEREOF

(71) Applicant: SAMSUNG ELECTRONICS CO., LTD., Suwon-si (KR)

(72) Inventors: Joon-kyu Seo, Suwon-si (KR); Kyung-a Kang, Seoul (KR); Il-kook Yun, Suwon-si (KR); Sang-keun Jung, Suwon-si (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/974,363

(22) Filed: Aug. 23, 2013

(65) Prior Publication Data

US 2014/0055345 A1 Feb. 27, 2014

(30) Foreign Application Priority Data

Aug. 23, 2012 (KR) .................. 10-2012-0092621

(51) Int. Cl.
*G06F 3/01* (2006.01)
*G06F 1/16* (2006.01)
*G06F 3/0488* (2013.01)

(52) U.S. Cl.
CPC ............. *G06F 3/017* (2013.01); *G06F 1/1643* (2013.01); *G06F 1/1652* (2013.01); *G06F 3/04883* (2013.01)

(58) Field of Classification Search
CPC ................ G06F 1/1652; G06F 2203/04102; G06F 2380/02; G06F 3/017; G06F 1/1643; G06F 3/04883

USPC .................................... 345/156, 173
See application file for complete search history.

(56) References Cited

U.S. PATENT DOCUMENTS

| | | | |
|---|---|---|---|
| 2008/0178126 A1 | 7/2008 | Beeck et al. | |
| 2010/0011291 A1* | 1/2010 | Nurmi | 715/702 |
| 2010/0045705 A1* | 2/2010 | Vertegaal et al. | 345/661 |
| 2010/0056223 A1 | 3/2010 | Choi et al. | |
| 2010/0141605 A1 | 6/2010 | Kang et al. | |
| 2010/0164888 A1* | 7/2010 | Okumura et al. | 345/173 |
| 2010/0277431 A1* | 11/2010 | Klinghult | 345/174 |
| 2011/0227822 A1* | 9/2011 | Shai | 345/156 |
| 2012/0154447 A1 | 6/2012 | Kim et al. | |
| 2013/0083496 A1* | 4/2013 | Franklin et al. | 361/749 |
| 2013/0169520 A1* | 7/2013 | Cho et al. | 345/156 |

(Continued)

FOREIGN PATENT DOCUMENTS

| | | |
|---|---|---|
| CN | 102089737 A | 6/2011 |
| WO | 2010/004080 A1 | 1/2010 |

OTHER PUBLICATIONS

Communication dated Nov. 14, 2013, issued by the European Patent Office in corresponding Application No. 13181384.2.

(Continued)

*Primary Examiner* — Stephen Sherman
(74) *Attorney, Agent, or Firm* — Sughrue Mion, PLLC

(57) ABSTRACT

A flexible apparatus is provided. The flexible apparatus includes: a sensor configured to sense bending of the flexible apparatus; and when it is determined that a rubbing gesture of rubbing a plurality of different areas of the flexible apparatus is performed based on a result of the sensing, a controller configured to perform an operation corresponding to the rubbing gesture.

32 Claims, 45 Drawing Sheets

(56) References Cited

U.S. PATENT DOCUMENTS

2013/0285922 A1* 10/2013 Alberth et al. .............. 345/173

OTHER PUBLICATIONS

International Search Report (PCT/ISA/210), dated Dec. 26, 2013, issued by the International Searching Authority in counterpart International Patent Application No. PCT/KR2013/007584.
Written Opinion (PCT/ISA/237), dated Dec. 26, 2013, issued by the International Searching Authority in counterpart International Patent Application No. PCT/KR2013/007584.
Communication dated Dec. 1, 2016, issued by the State Intellectual Property Office of P.R. China in counterpart Chinese application No. 201380043491.1.

* cited by examiner

FIG. 21
(a)
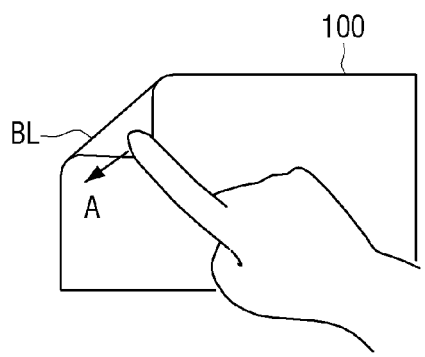
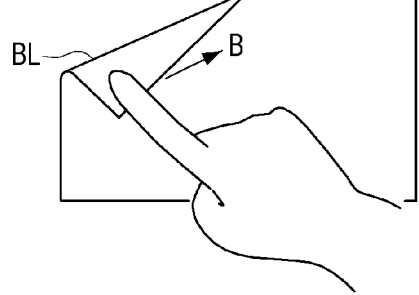
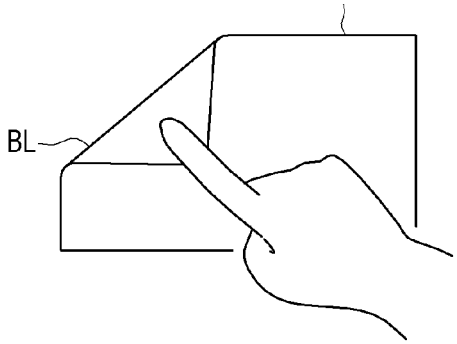
(b)
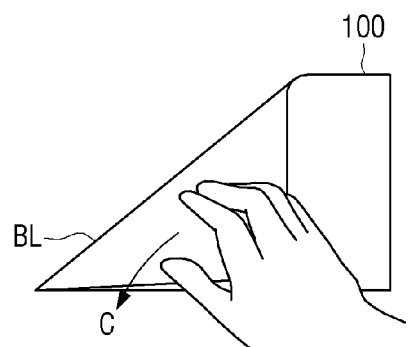
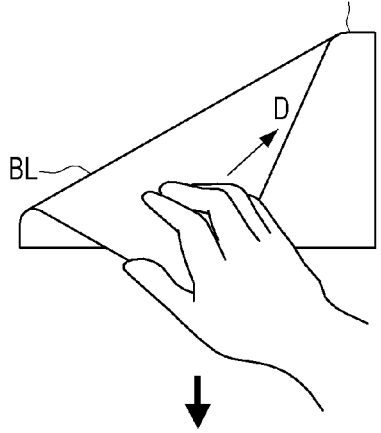
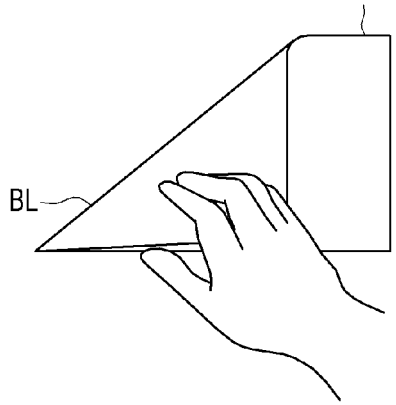

FIG. 22
(a)
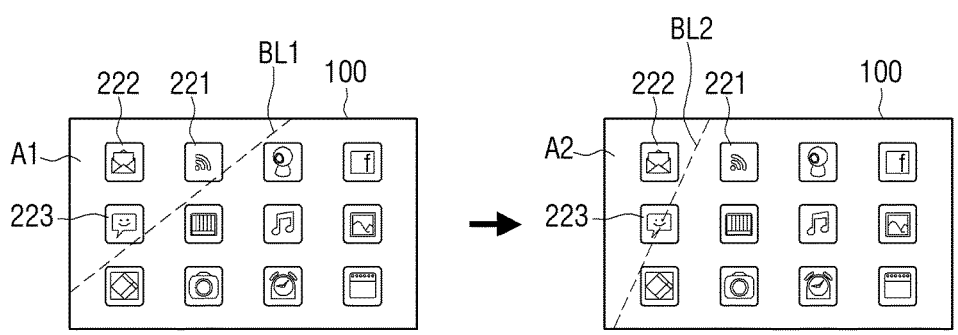
(b)
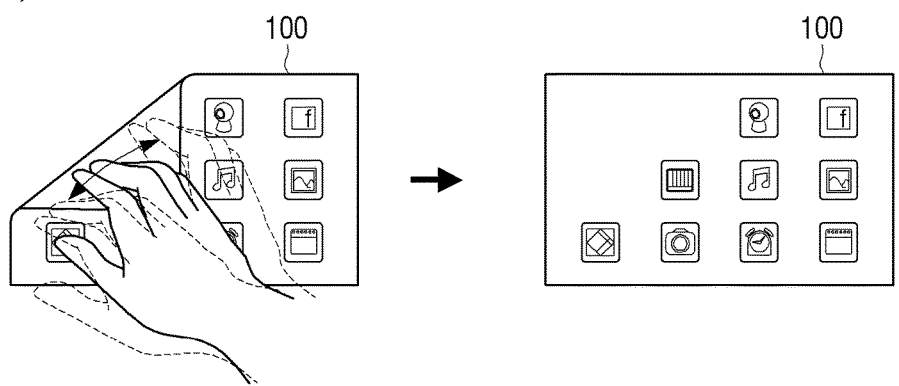

FIG. 24
(a) (b)
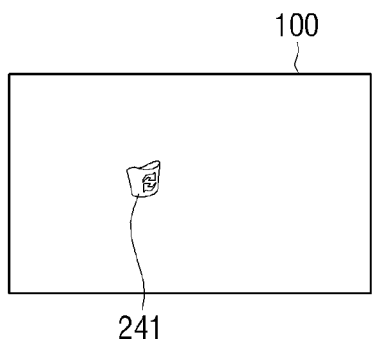
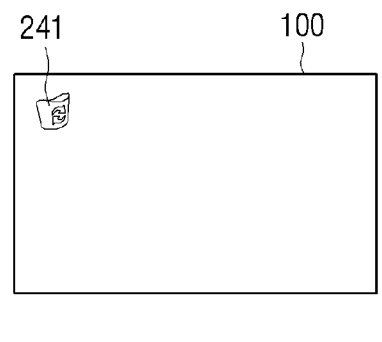
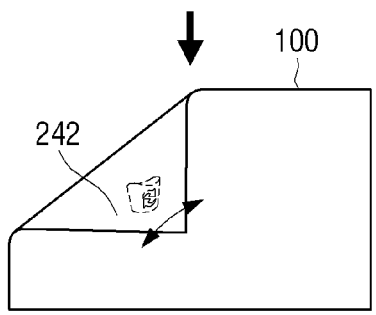
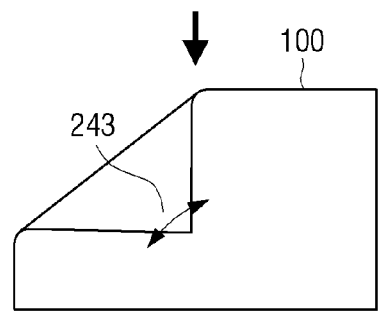
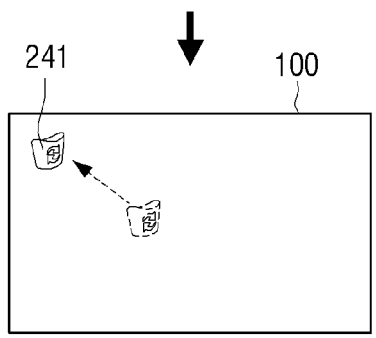
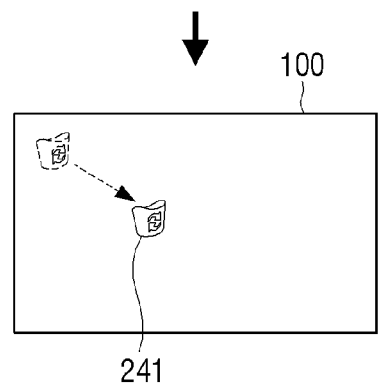

FIG. 36
(a)
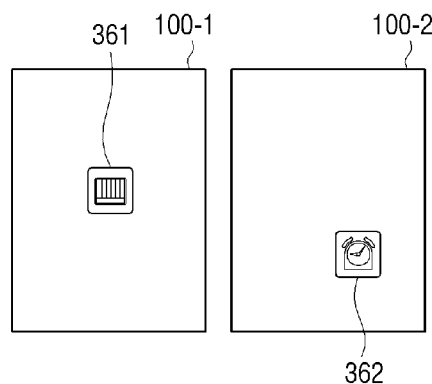
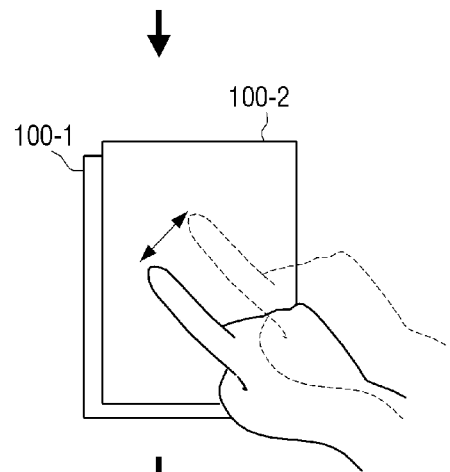
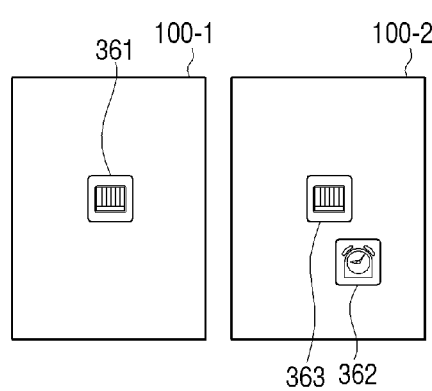
(b)
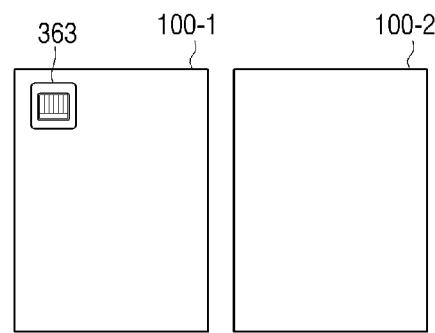
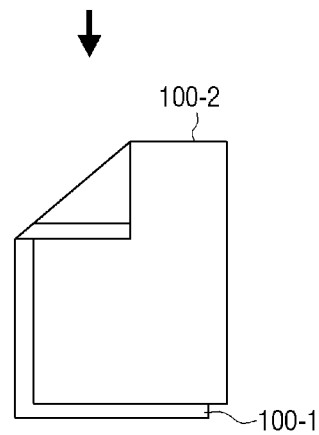
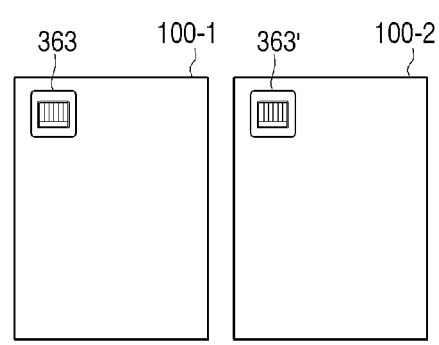

FIG. 40
(a)
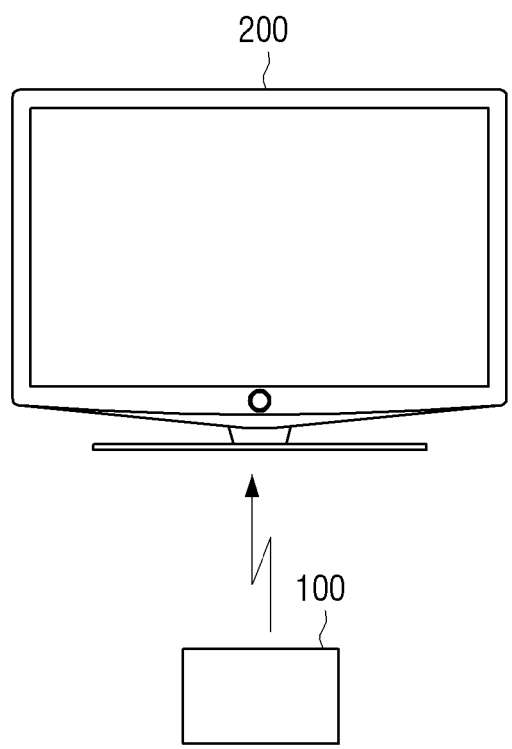
(b)
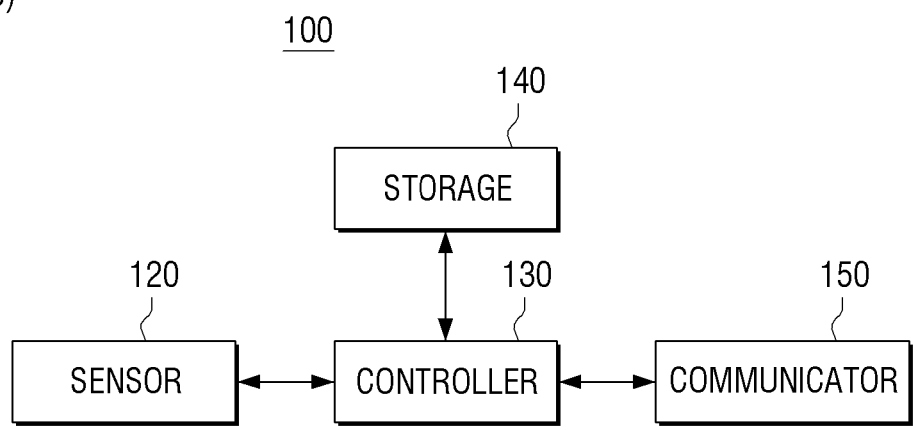

FIG. 42
(a)
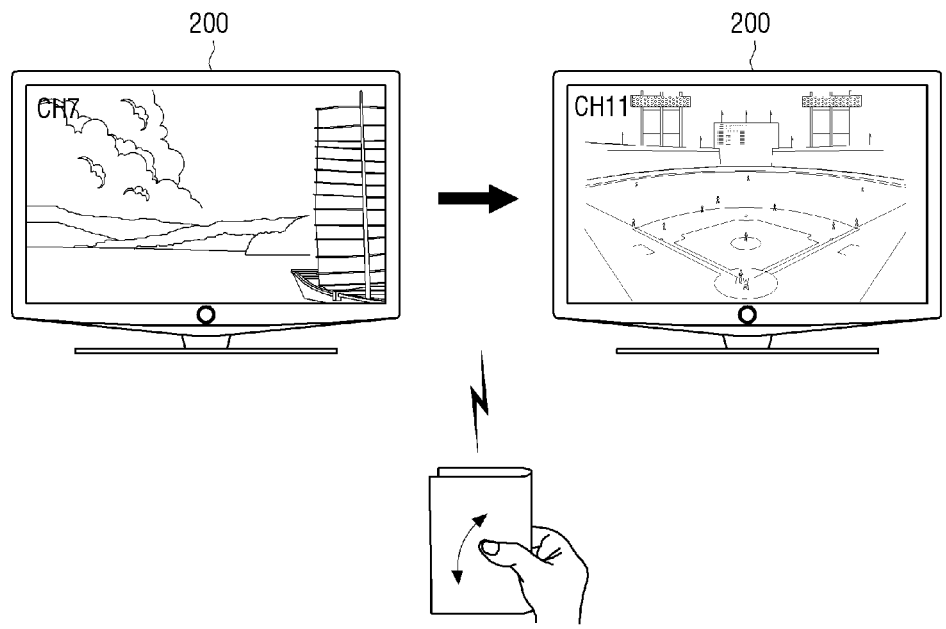
(b)
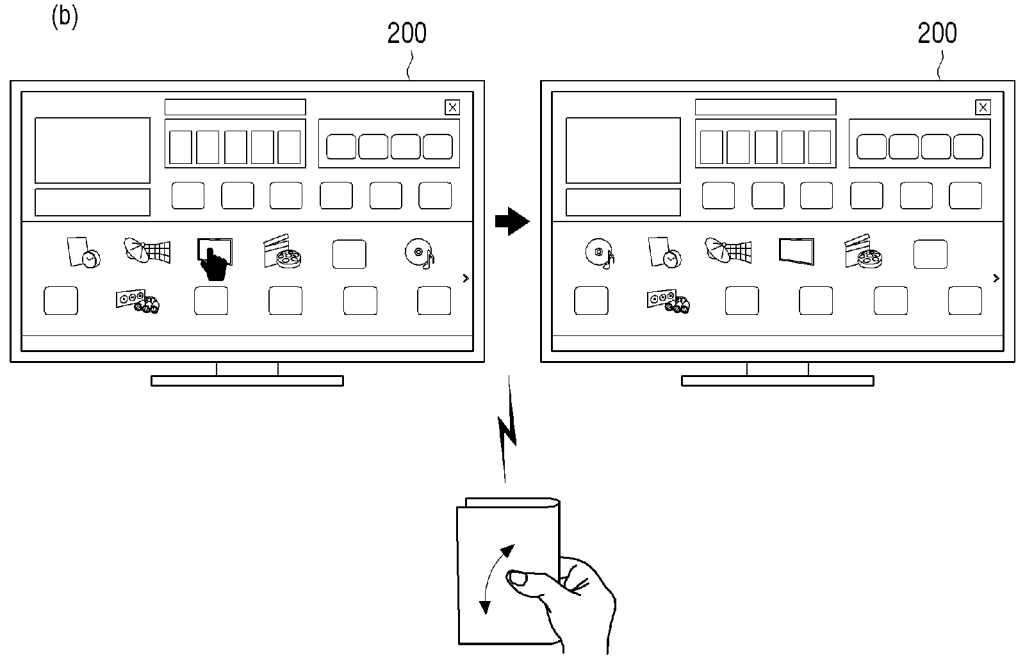

FIG. 44
(a)
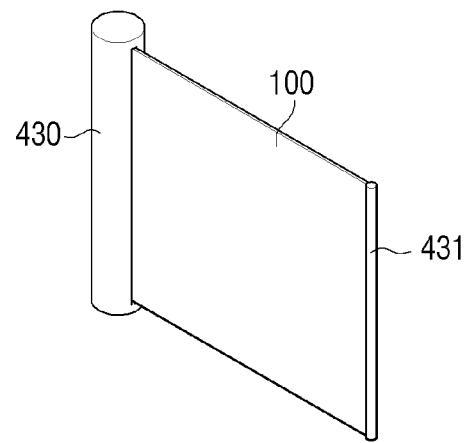
(b)
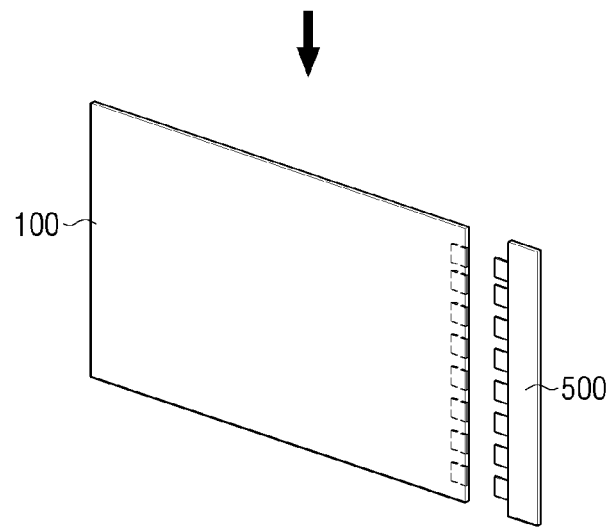

FIG. 45
(a)
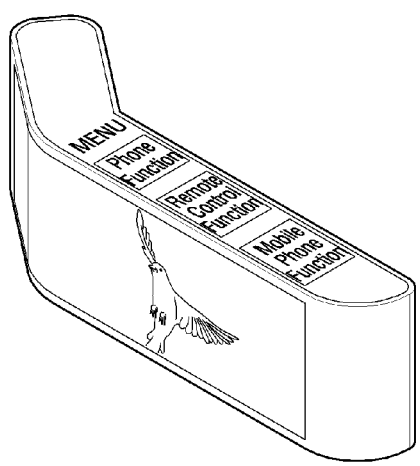
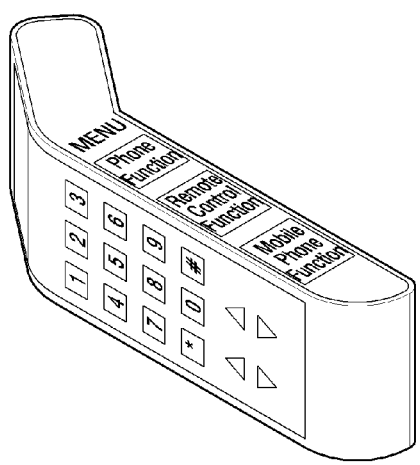
(b)
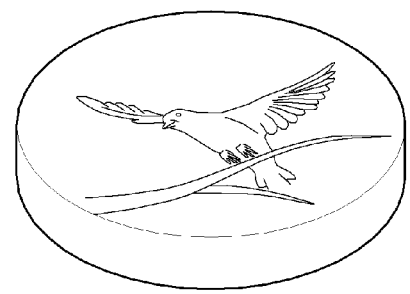
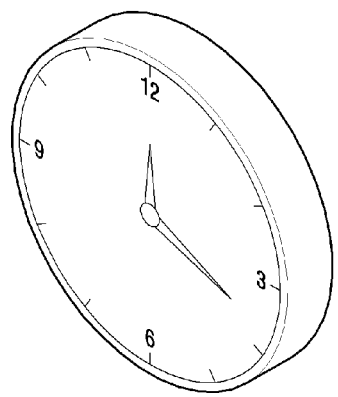

FLEXIBLE APPARATUS AND CONTROL METHOD THEREOF

CROSS-REFERENCE TO RELATED APPLICATION

This application claims priority from Korean Patent Application No. 10-2012-0092621, filed on Aug. 23, 2012, in the Korean Intellectual Property Office, the disclosure of which is incorporated herein by reference in its entirety.

BACKGROUND

1. Field

Apparatuses and methods consistent with exemplary embodiments relate to a flexible apparatus and a control method thereof.

2. Description of the Related Art

With the development of electronic technologies, various kinds of display apparatuses have been developed. In particular, display apparatuses such as television (TVs), personal computers (PCs), laptops, tablet PCs, mobile phones, and MP3 players are widely used to such an extent that they can be found in most households.

In order to meet consumer demands for new functions and new forms of displays, an effort to develop new forms of displays is ongoing. One of the results of this effort is a next generation display apparatus in the form of a flexible display apparatus.

The flexible apparatus refers to a display apparatus that may be deformed into different shapes and configurations.

The flexible apparatus may be deformed by a force that is applied by a user, and thus may be used for various purposes. For instance, the flexible apparatus may be deformed to function as a mobile phone, tablet PC, electronic album, personal digital assistant (PDA), and MP3 player.

The flexible apparatus has flexibility unlike existing apparatuses. Therefore, there is a need for a method for using the flexibility in various ways.

SUMMARY

One or more exemplary embodiments may overcome the above disadvantages and other disadvantages not described above. However, it is understood the exemplary embodiments are not required to overcome the disadvantages described above, and may not overcome any of the problems described above.

Aspects of the exemplary embodiments provide a flexible apparatus which can perform various functions intuitively associated with a bending manipulation state, and a control method thereof.

According to an aspect of an exemplary embodiment, there is provided a flexible apparatus including: a sensor configured to sense bending of the flexible apparatus and a controller configured to determine that the bending corresponds to a rubbing gesture, and to control the flexible apparatus to perform an operation corresponding to the rubbing gesture, in response to determining that the bending corresponds to the rubbing gesture, wherein the rubbing gesture comprises a rubbing a plurality of different areas of the flexible apparatus.

The plurality of areas may be divided by a bending line formed by the bending.

The controller may be configured to determine that the bending corresponds to the rubbing gesture if the bending line is continuously moved for a predetermined area during a predetermined time.

The controller may be configured to determine that the bending corresponds to the rubbing gesture if a first pattern of the bending line is changed between a first location to a second location.

The sensor may sense whether the plurality of different areas divided by the bending line are brought into contact with each other, and the controller is configured to determine that the bending corresponds to the rubbing gesture if a contact area between the plurality of areas is continuously changed during a predetermined time.

The flexible apparatus may further include a display configured to display a screen, and the plurality of different areas may be a plurality of different areas on the screen.

The controller may be configured to perform a function related to an object displayed on at least one of the plurality of areas divided by the bending line in response to determining that the bending corresponds to the rubbing gesture.

The function may be one of deleting the object displayed on the at least one of the plurality of areas divided by the bending line, moving the object to another area and displays the moved object, or copying the object into another area and displays the copied object, in response to determining that the bending corresponds to the rubbing gesture.

The function may be one of with respect to all content displayed on the screen or all content executed on the screen, and with respect to some of the content displayed on the at least one of the plurality of areas or some contents executed in the at least one of the plurality of areas.

The controller may provide a feedback effect of the rubbing gesture.

The flexible apparatus may further include a communicator configured to communicate with an electronic apparatus, and the controller may generate a control signal to instruct the electronic apparatus to perform an operation corresponding to the rubbing gesture, and transmits the control signal to the electronic apparatus.

According to an aspect of another exemplary embodiment, there is provided a method for controlling of a flexible apparatus, the method including: sensing bending of the flexible apparatus, determining that the bending corresponds to a rubbing gesture, and performing an operation corresponding to the rubbing gesture in response to determining that the bending corresponds to the rubbing gesture, wherein the rubbing gesture comprises a rubbing of a plurality of different areas of the flexible apparatus.

According to aspects of the exemplary embodiments, various functions can be intuitively provided to the users and user convenience can be improved.

BRIEF DESCRIPTION OF THE DRAWINGS

The above and other aspects will be more apparent by describing in detail exemplary embodiments, with reference to the accompanying drawings, in which:

FIG. 21 is a view illustrating an operation of a rubbing gesture according to an exemplary embodiment;

FIG. 22 is a view illustrating a method for dividing an area according to an exemplary embodiment;

FIG. 24 is a view illustrating a function performed according to a rubbing gesture according to another exemplary embodiment;

FIGS. 25 to 38 are views illustrating a function performed according to a rubbing gesture according to still another exemplary embodiment;

FIG. 40 is a view illustrating a configuration of a flexible apparatus interlocked with an external display apparatus according to still another exemplary embodiment;

FIG. 42 is a view illustrating a method for operating the flexible apparatus shown in FIG. 40;

FIGS. 44 and 45 are views illustrating examples of a flexible display apparatus according to various exemplary embodiments.

DETAILED DESCRIPTION OF EXEMPLARY EMBODIMENTS

Figure 1:
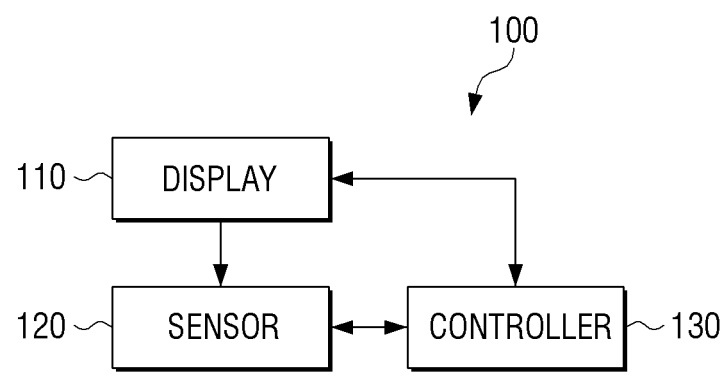
FIG. 1 is a block diagram illustrating a configuration of a flexible display apparatus according to an exemplary embodiment.

Hereinafter, exemplary embodiments will be described in greater detail with reference to the accompanying drawings.

In the following description, same reference numerals are used for the same elements depicted in different drawings. The matters defined in the description, such as detailed construction and elements, are provided to assist in a comprehensive understanding of the exemplary embodiments. Thus, it is apparent the exemplary embodiments may be carried out without those specifically defined matters. Also, functions or elements known in the related art are not described in detail to avoid obscuring the exemplary embodiments with unnecessary detail.

FIG. 1 is a block diagram illustrating a configuration of a flexible display apparatus according to an exemplary embodiment. Referring to FIG. 1, a flexible display apparatus 100 includes a display 110, a sensor 120, and a controller 130.

The display 110 displays a screen. The flexible display apparatus 100 including the display 110 may be bent (e.g., deformed). Accordingly, the display 110 should have a bendable (e.g., deformable) structure and be made of a material. The display 110 will be explained in detail below.

The sensor 120 may sense bending of the display 110. Specifically, the sensor 120 may recognize a bending/folding location, a bending/folding direction, a bending/folding angle, a degree of bending/folding, a bending/folding speed, a number of times that bending/folding occurs, a point of time at which bending/folding occurs, and a bending/folding holding time, using a bend sensor and a pressure sensor.

Specifically, the sensor 120 may recognize the degree of bending by measuring a radius of curvature (R) of a bending location based on a change in the distribution of resistance values output from the bend sensor or a change in the pressure distribution sensed by the pressure sensor.

Also, the sensor 120 may recognize the bending speed based on changes in the bending location and the degree of bending, which are sensed based on the change in the distribution of the resistance values output from the bend sensor or the change in the pressure distribution sensed by the pressure sensor.

Also, the sensor 120 may sense a change in a bending state. Specifically, the sensor 120 may recognize a change in the bending/folding location, a change in the bending/folding direction, a change in the bending/folding angle, and a change in the degree of bending/folding.

The sensor 120 may recognize a bending line, which is formed by a bending input, and a change in the bending line. Specifically, the sensor 120 may recognize the bending line based on the change in the distribution of the resistance values output from the bend sensor, or the change in the pressure distribution sensed by the pressure sensor. The bending line refers to a point at which the greatest bending occurs on the bending area. For example, the bending line may refer to an imaginary line which connects bending points (or bending coordinates) at which the greatest resistance value is output from the bend sensor.

The sensor 120 may sense whether first and second areas, which are divided by the recognized bending line, are brought into contact with each other using various contact sensors. The contact sensor may be implemented by using a touch sensor and a pressure sensor.

The sensor 120 may sense whether areas close to each other because of the bending (for example, areas adjacent to the bending line) using a proximity sensor. The areas close to each other do not contact each other.

The sensor 120 may recognize a rubbing gesture based on a location of the bending line and a degree of change, a range in which the bending line is changed, a bending holding time, and information on whether the first and second areas divided by the bending line are brought into contact with each other.

The rubbing gesture is an operation of rubbing a plurality of different areas, and may refer to continuously changing at least one of a contact location and a contact area within a predetermined time range while at least some areas of the first area and at least some areas of the second area are in contact with each other. The first and second areas may be divided by the bending line.

Although a plurality of bending lines may be formed according to the rubbing gesture, a bending line that is formed by a first or final bending manipulation to make the rubbing gesture, or a bending line that is an average of a plurality of bending line locations may be a bending line for dividing the area. Also, according to circumstances, an area in which a plurality of bending lines are formed is defined as a boundary area and the other areas except for the boundary area may be divided into the first and second areas.

Accordingly, when at least one of the contact location and the contact area is continuously changed while at least some areas of the first area and at least some areas of the second areas are in contact with each other, the controller 130 may determine that the rubbing gesture is performed.

Specifically, when a change state in at least one of the contact location and the contact area has a predetermined repeating pattern, the controller 130 may determine that the rubbing gesture is performed. For example, when a pattern, in which the contact location is changed from a first location of the first area and a second location of the second area to a third location of the first area and a fourth location of the second area, is changed back to the first location of the first area and the second location of the second area, the controller 130 may determine that the rubbing gesture is performed.

On the other hand, since the bending line may be changed by the rubbing gesture, the controller 130 may determine whether the rubbing gesture is performed by recognizing a change state in the bending line.

Specifically, when a change state in an imaginary bending line formed based on a result of sensing by the sensor 120 has a predetermined repeating pattern, the controller 130 may determine that the rubbing gesture is performed. For example, when a pattern in which the bending line moves beyond a predetermined range in a fifth location and moves to a sixth location, and then returns to the first location or a location close to the first location is repeated at least once, it may be determined that the rubbing gesture is performed.

The first to sixth locations described above are areas that include a predetermined error range and may be defined as a line or a face having an area larger than a predetermined threshold value.

When the contact area between the first area and the second area, which are divided by the bending line, is sensed by the sensor 120 as being continuously changed within a predetermined time range, the controller 130 may determine that the rubbing gesture is performed. In this case, when an object's approach is sensed in the proximity of the bending line other than the contact area, the controller 130 may determine that the rubbing gesture is performed.

When it is determined that the rubbing gesture is performed according to a result of sensing by the sensor 120, the controller 130 may perform an operation corresponding to the rubbing gesture.

The operation corresponding to the rubbing gesture may be a function related to an object displayed on at least one of a plurality of areas divided by the bending line, but is not limited thereto. The controller 130 may perform a predetermined function corresponding to an area at which the rubbing gesture is performed even when the function is not related to the object displayed on the screen.

Specifically, the controller 130 may perform various operations corresponding to the rubbing gesture, such as copying, deleting, and storing the object, ending execution, changing to a default screen, adjusting brightness, turning off/turning on, and displaying detailed information. That is, various functions which may be intuitively recognized by users as functions corresponding to the rubbing gesture may be performed by the rubbing gesture.

When it is determined that the rubbing gesture is performed, the controller 130 may delete at least one object displayed on at least one of the plurality of areas divided by the bending line, move the object to another area and display the moved object, or may delete an object displayed on one of the plurality of areas, moves the object to another area and displays the moved object. For example, the controller 130 may delete at least one object that is displayed on an area contacting the second area from among the plurality of objects displayed on the first area.

Also, when it is determined that the rubbing gesture is performed, the controller 130 may copy at least one object displayed on one of the plurality of areas divided by the bending line into another area, and may display and/or store the copied object.

Also, when it is determined that the rubbing gesture is performed, the controller 130 may store information on an object displayed on one of the plurality of areas divided by the bending line in a storage space corresponding to another area. For example, when a right upper corner area performs a storage function, a content displayed on a target area which is rubbed along with the right upper corner area may be stored in a corresponding area.

Also, when it is determined that the rubbing gesture is performed, the controller 130 may display detailed information on an object which is displayed on one of the plurality of areas divided by the bending line. In this case, the controller 130 may display the detailed information on the area where the object is displayed, and may display the detailed information on the other area when the flexible display apparatus 100 is changed to a flat state.

When it is determined that a whole rubbing gesture for which each of the plurality of areas divided by the bending line occupies an area larger than a predetermined area is performed, the controller 130 may perform a predetermined function with respect to all contents displayed on a screen or all contents executed on the screen. For example, when it is determined that the whole rubbing gesture is performed while a music playback function and a web page display function are executed as a multi-tasking function, the controller 130 may perform an end function with respect to all of the music playback function and the web page display function. Accordingly, a default screen, such as a home screen or a standby screen, may be displayed.

When it is determined that a partial rubbing gesture for which at least one of the plurality of areas occupies an area smaller than a predetermined area is performed, the controller 130 may perform a predetermined function with respect to some contents which are displayed on the area at which the partial rubbing gesture is performed or some contents which are executed on the area. For example, when it is determined that the partial rubbing gesture is performed while a music playback function and a web page display function are executed as a multi-tasking function, the controller 130 may perform an end function with respect to only the function corresponding to an area where the partial rubbing gesture is performed. That is, when the partial rubbing gesture is performed on a music player screen corresponding to the music playback function, the controller 130 may end only the music playback function. When the music playback function is ended, the music player screen may disappear or stop while the music player screen is still displayed.

In the above-described exemplary embodiment, the partial rubbing gesture and the whole rubbing gestures are distinguished from each other according to whether the plurality of areas divided by the bending line are smaller than the predetermined area or larger than the predetermined area. However, according to circumstances, the partial rubbing gesture and the whole rubbing gesture may be distinguished from each other with reference to an area at which a real rubbing gesture is performed. For example, when each of the plurality of areas divided by the bending line is larger than the predetermined area, but a real rubbing operation, for example, touching the screen with user's finger and moving the finger while still touching the screen, is performed only on a local area smaller than the predetermined area, it may be determined that the partial rubbing gesture is performed.

Also, the controller 130 may provide a feedback effect on the rubbing gesture to distinguish the object determined as being rubbed from the other objects.

Specifically, the controller 130 may provide at least one of a graphic effect, a sound effect, and a haptic effect to the object or around the object, or the controller 130 may provide at least one of the graphic effect, the sound effect, and the haptic effect to the area where the rubbing gesture is performed. Also, according to circumstances, the controller 130 may provide the above-mentioned feedback effects simultaneously.

Also, the controller 130 may inform the user that the flexible display apparatus is in a ready state in which the rubbing gesture is possible, using a light emitting diode (LED) provided in a rear surface of the display screen. For example, when the flexible apparatus is bent by more than a predetermined bending angle, a bending line is formed where a specific object can be designated, and contact is made where a specific object can be designated, the controller 130 determines that the flexible display apparatus is in the ready state and turns on the LED provided in the corresponding area.

However, this should not be considered as limiting. The operation corresponding to the rubbing gesture may be implemented in various forms according to a kind of the flexible display apparatus 100. For example, when the flexible display apparatus 100 is a mobile phone, the controller 130 may perform a function corresponding to the rubbing gesture from among various functions, such as connecting a call, rejecting a call, displaying a menu, sending and receiving a message, selecting and executing an application, and executing and ending a web browser. As another example, when the flexible display apparatus 100 is a television (TV), the controller 130 may perform a function corresponding to the rubbing gesture from among various functions, such as selecting a channel, adjusting a volume, adjusting brightness, adjusting color, and adjusting contrast. As still another example, when the flexible display apparatus 100 is an e-book, the controller 130 may perform a function corresponding to the rubbing gesture from among various functions, such as displaying a memo pad, displaying a page marked with a bookmark, turning fast, a highlight function, a private storing function, and an abstract viewing function, and a page combining function.

The flexible display apparatus 100 may be implemented using various kinds of display apparatuses, such as a PDA, an electronic album, an electronic scheduler, an MP3 player, a tablet PC, a laptop computer, and a monitor, and when the rubbing gesture is recognized, the flexible display apparatus 100 may perform various functions according to characteristics of each apparatus.

As described above, the display 110 should be manufactured to have a deformable form. The sensor 120 may sense a deformation state in various ways.

Hereinafter, a detailed configuration of the display 110 and a method for sensing bending thereof will be explained in detail.

Figure 2:
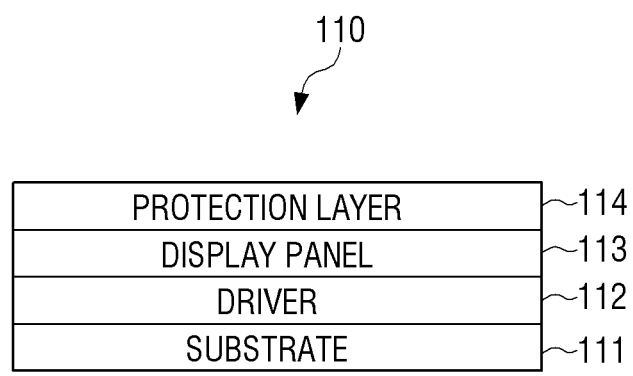
FIG. 2 is a view illustrating a basic configuration of a display of a flexible display apparatus according to an exemplary embodiment.

FIG. 2 is a view to illustrate a basic configuration of a display of a flexible display apparatus according to an exemplary embodiment. Referring to FIG. 2, the display 110 includes a substrate 111, a driver 112, a display panel 113, and a protection layer 114.

The flexible display apparatus 100 may be an apparatus that can be bent, deformed, crooked, folded or rolled like paper, while maintaining display characteristics of a flat panel display apparatus. Accordingly, the flexible display apparatus should be manufactured on a flexible substrate.

Specifically, the substrate 111 may be implemented by using a plastic substrate (for example, a polymer film) which is deformable by an external pressure.

The plastic substrate has a structure formed by barrier coating opposite surfaces of a base film. The base film may be implemented by using various resins such as polyimide (PI), polycarbonate (PC), polyethyleneterephtalate (PET), polyethersulfone (PES), polythylenenaphthalate (PEN), and fiber reinforced plastic (FRP). The barrier coating is performed on the opposite surfaces of the base film. An organic membrane or an inorganic membrane may be used for the purpose of maintaining flexibility.

The substrate 111 may also be formed of a flexible material, such as thin glass or metal foil.

The driver 112 drivers the display panel 113. Specifically, the driver 112 applies a driving voltage to a plurality of pixels which constitute the display panel 113, and may be implemented by using a-si TFT, a low temperature poly silicon (LTPS) TFT, or an organic TFT (OTFT) and so on. The driver 112 may also be implemented in various forms according to the form of the display panel 113. For instance, the display panel 113 may consist of an organic light emitting substance which includes a plurality of pixel cells, and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may be implemented using an electroluminescent display (EL), an electrophoretic display (EPD), an electrochromic display (ECD), a liquid crystal display (LCD), an active matrix LCD (AMLCD), and a plasma display panel (PDP), besides an organic light emitting diode (OLED). When the display panel 113 is embodied by the LCD, the display panel 113 cannot emit light by itself and thus may require a separate backlight unit. When the LCD does not use backlight, the LCD may use ambient light. In order to use the LCD display panel 113 without the backlight unit, an environment, such as a lighted outdoor environment, may be used to operate the LCD.

The protection layer 114 protects the display panel 113. For example, the protection layer 114 may be made of ZrO, CeO2, or Th O2. The protection layer 114 may be manufactured as a transparent film and may cover the entire surface of the display panel 113.

Unlike in FIG. 2, the display 110 may also be implemented using electronic paper (e-paper). The e-paper is a display that applies general ink characteristics to paper, and is different from a general flat panel display in that e-paper uses reflected light. The electronic paper may change a picture or text using electrophoresis, which uses a twist ball or a capsule.

When the display 110 is comprised of elements made of a transparent material, the display 110 may be implemented as a display apparatus that is bendable and transparent. For example, when the substrate 111 is made of a polymer material such as plastic having transparency, if the driver 112 is implemented by using a transparent transistor, and, when the display panel 113 is implemented by using a transparent organic light emitting layer and a transparent electrode, the display 110 may have transparency.

The transparent transistor refers to a transistor that is manufactured by substituting opaque silicon of an existing thin film transistor with a transparent material such as zinc oxide or titanium oxide. The transparent electrode may be made of advanced materials such as indium tin oxide (ITO) or graphene. Graphene refers to a material that has a planar structure of a honeycomb shape in which carbon atoms are connected to one another, and has transparency. The transparent organic light emitting layer may be implemented by using various materials.

Figure 3:
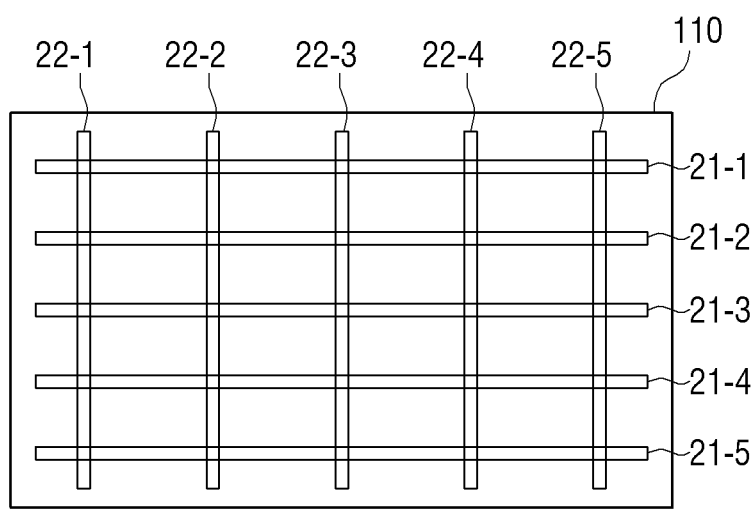
FIGS. 3 to 5 are views illustrating a method for sensing bending according to an exemplary embodiment.

FIG. 3 is a view illustrating a method for sensing bending according to an exemplary embodiment.

The flexible display apparatus 100 can be bent by an external pressure and the shape of the flexible display apparatus 100 may be deformed. Types of deformation may include "bending" "folding," "rolling" and other types of deformation.

Folding refers to a state in which the flexible display apparatus 100 is folded. Folding and bending may be distinguished from each other by a degree of bending (e.g., deformation). For example, when deformation is performed by more than a predetermined bending angle, the deformation corresponds to a folding deformation, and, when deformation is performed by less than the predetermined bending angle, the deformation corresponds to bending.

Rolling refers to a state in which the flexible display apparatus is rolled. Rolling is also determined based on a bending angle. For example, when bending of more than a predetermined bending angle is sensed over a predetermined area, the bending corresponds to a rolling deformation. On the other hand, when bending of less than the predetermined bend angle is sensed in an area relatively smaller than that of rolling, the bending corresponds to a folding deformation. The bending, folding and rolling described above may be determined based on a radius of curvature besides the bending angle.

Also, a state in which the rolled flexible display apparatus 100 has a substantially circular or oval cross section may be set to correspond to rolling, regardless of a radius of curvature.

The various shape deformations described above are merely exemplary and shape deformation may be set differently according to the type, size, weight, and characteristic of the flexible display apparatus. For example, when the flexible display apparatus 100 can be bent to such an extent that the surfaces are in contact with each other, the state in which the surfaces of the flexible display apparatus 100 are in contact with each other by bending may correspond to folding. On the other hand, a state in which a front surface and a rear surface of the flexible display apparatus are in contact with each other by bending may correspond to rolling.

For the convenience of explanation, the bending deformation will be described.

The flexible display apparatus 100 may sense bending in various ways.

For example, the sensor 120 may include at least one of a bend sensor disposed on one surface, such as a front surface or a rear surface, of the display 110, or a bend sensor disposed on opposite surfaces of the display 110. The controller 130 may sense bending using a value sensed by the bend sensor.

The bend sensor (e.g., a deformation sensor) refers to a sensor that can be bent and has a resistance value which varies according to a degree of bending. The bending sensor may be implemented by using devices such as an optical fiber bending sensor, a pressure sensor, and a strain gauge.

The sensor 120 may sense a resistance value of the bend sensor using a level of a voltage applied to the bend sensor or an intensity of a current flowing in the bend sensor, and may sense a bending state in a location of the bend sensor according to the sensed resistance value.

In FIG. 3, the bend sensor is embedded in the front surface of the display 110. However, this is merely an example and the bend sensor may be embedded in the rear surface of the display 110 or may be embedded in opposite surfaces. Also, the shape, number, and location of bend sensors may be variously changed. For example, the display 110 may include a single bend sensor or a plurality of bend sensors connected to one another. The single bend sensor may sense one bending data, but may include a plurality of sensing channels to sense a plurality of bending data.

FIG. 3 illustrates an example of a plurality of bar-shaped bend sensors arranged in a vertical direction and a horizontal direction in a grid pattern.

Referring to FIG. 3, the bend sensor includes bend sensors 21-1 to 21-5 arranged in a first direction, and bend sensors 22-1 to 22-5 arranged in a second direction perpendicular to the first direction. The bend sensors are disposed away from one another by a predetermined distance.

In FIG. 3, five bend sensors (21-1 to 21-5, 22-1 or 22-5) are arranged in each of the horizontal direction and the vertical direction in a grid formation. However, this is merely an example and the number of bend sensors may be changed according to a size of the flexible display apparatus 100. The bend sensors are arranged in the horizontal direction and the vertical direction to sense bending from the entire area of the flexible display apparatus. Therefore, when only a part of the flexible display apparatus is flexible or when the flexible display apparatus needs to sense bending of only a part of the apparatus, the bend sensor may be arranged in only a corresponding portion of the apparatus.

Each of the bend sensors 21-1 to 21-5, 22-1 to 22-5 may be implemented by using an electric resistance sensor which uses an electric resistance, or a micro optical fiber sensor which uses a strain of an optical fiber. Hereinafter, the bend sensor will be explained with the assumption that the bend sensor is the electric resistance sensor for the convenience of explanation.

Figure 4:
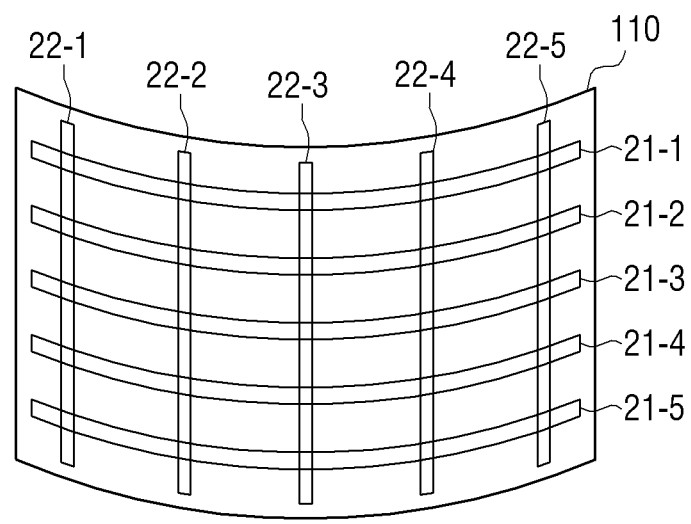

Specifically as shown in FIG. 4, when the flexible display apparatus 100 is bent so that its center area with reference to left and right edges is oriented downwardly, tension caused by bending is exerted on the bend sensors 21-1 to 21-5 arranged in the horizontal direction. Therefore, the resistance value of each of the bend sensors 21-1 to 21-5 arranged in the horizontal direction is changed. The sensor 120 senses the change in the output value output from each of the bend sensor 21-1 to 21-5 and thus determines that bending is performed in the horizontal direction with reference to the center of a display surface. In FIG. 4, the center area is bent in a downward direction (hereinafter, referred to as a Z− direction) which is perpendicular to the display surface. However, even when the center area is bent in an upward direction (hereinafter, referred to as a Z+ direction) with reference to the display surface, the bending may be sensed based on the change in the output values of the bend sensors 21-1 to 21-5 arranged in the horizontal direction.

Figure 5:
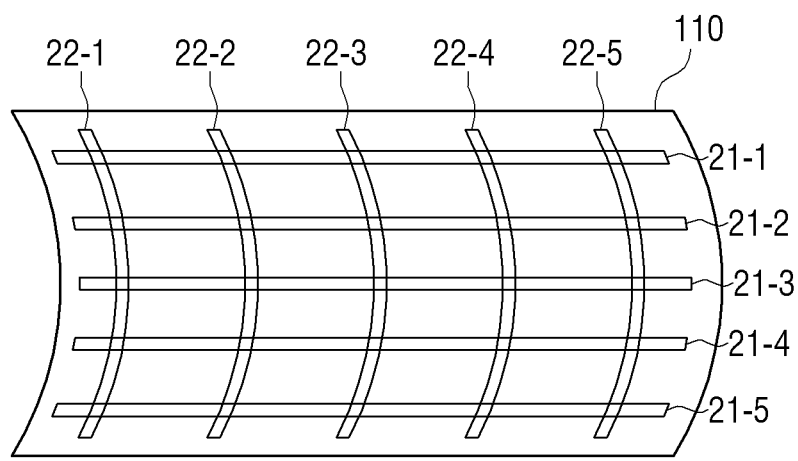

When the flexible display apparatus 100 is bent so that the center area with reference to upper and lower edges is oriented upwardly as shown in FIG. 5, tension is exerted to the bend sensors 22-1 to 22-5 arranged in the vertical direction. The sensor 120 may sense shape deformation of the vertical direction based on the output values of the bend sensors 22-1 to 22-5 arranged in the vertical direction. Although the bending in the Z+ direction is illustrated in FIG. 5, bending in the Z− direction may also be sensed using the bend sensors 22-1 to 22-5 arranged in the vertical direction.

When shape deformation occurs in a diagonal direction, tension is exerted to all of the bend sensors arranged in the horizontal direction and the vertical direction. Therefore, the shape deformation of the diagonal direction may be sensed based on the output values of the bend sensors arranged in the horizontal and vertical directions.

Hereinafter, a method for sensing each shape deformation using a bend sensor will be explained in detail.

Figure 6:
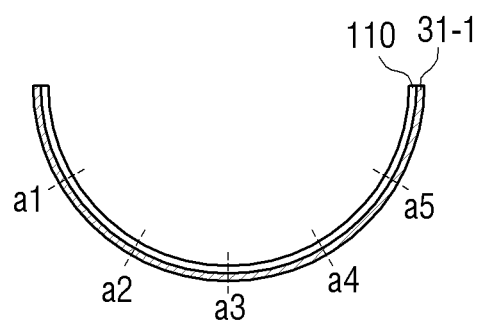
FIGS. 6 and 7 are views illustrating a method for sensing bending using a bend sensor in a flexible display apparatus according to an exemplary embodiment.
Figure 7:
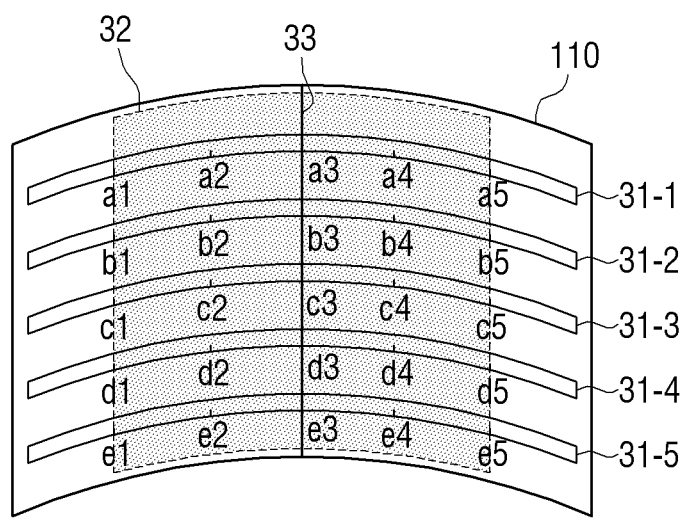

FIGS. 6 and 7 are views illustrating a method for sensing bending in the display apparatus using the bend sensors according to an exemplary embodiment.

First, FIG. 6 is a cross section view of the flexible display apparatus 100 when the flexible display apparatus is bent.

When the flexible display apparatus 100 is bent, the bend sensors, which are arranged on one surface or opposite surfaces of the flexible display apparatus 100, are also bent and have resistance values corresponding to a magnitude of exerted tension, and output values corresponding to the resistance values.

For instance, when the flexible display apparatus 100 is bent as shown in FIG. 6, a bend sensor 31-1, which is disposed on a rear surface of the flexible display apparatus 100, is also bent and outputs a resistance value according to a magnitude of exerted tension.

In this case, the magnitude of the tension increases in proportion to a degree of bending. When bending occurs as shown in FIG. 6, the greatest bending occurs in the center area. Accordingly, the greatest tension is exerted to the bend sensor 31-1, which is disposed at a point a3 which is the center area, and accordingly, the bend sensor 31-1 has the greatest resistance value. On the other hand, the degree of bending gradually decreases toward the edge. Accordingly, the bend sensor 31-1 has smaller resistance values as distance increases from the point a3 to points a2 and a1 or points a4 and a5.

When the resistance value output from the bend sensor has the greatest value at a specific point and gradually decreases in outward directions, the sensor 120 may determine that the area from which the greatest resistance value is sensed is most significantly bent. Also, when an area has no change in the resistance value, the sensor 120 determines that the area is a flat area in which bending is not performed, and, when an area has the resistance value changed more than a predetermined value, determines that the area is a bent area in which a degree of bending occurs.

FIG. 7 is a view to illustrate a method for defining a bending area according to an exemplary embodiment. FIG. 7 is a view to illustrate the case in which the flexible display apparatus 100 is bent in the horizontal direction with reference to the front surface, and thus do not illustrate the bend sensors arranged in the vertical direction for the convenience of explanation. Although different reference numerals are used for the bend sensors in each drawing, the bend sensors illustrated in FIG. 3 may be used.

A bending area is an area in which the flexible display apparatus is bent. Since the bend sensor also may be bent by bending the flexible display apparatus 100, all points at which the bend sensors output different resistance values from originals values may delineate a bending area.

The sensor 120 may sense a size of a bending line, a direction of the bending line, a location of the bending line, a number of bending lines, a number of times that bending is performed, a bending speed of a shape deformation, a size of a bending area, a location of the bending area, and a number of bending areas, based on a relationship between the points at which a change in the resistance value is sensed.

Specifically, when a distance between the points at which the change in the resistance value is sensed lies within a predetermined distance, the points are sensed as one bending area. On the other hand, when the distance between the points at which the change in the resistance value is sensed lies beyond the predetermined distance, different bending areas are delineated with reference to these points. This will be explained in detail below with reference to FIG. 7.

FIG. 7 is a view to illustrate a method for sensing one bending area. When the flexible display apparatus 100 is bent as shown in FIG. 7, the resistance values from points a1 to a5 of a bend sensor 31-1, from points b1 to b5 of a bend sensor 31-2, from points c1 to c5 of a bend sensor 31-3, from points d1 to d5 of a bend sensor 31-4, and from points e1 to e5 of a bend sensor 31-5 are different from the resistance values of the sensors 31-1 to 31-5 in their original states.

In this case, the points at which the change in the resistance value is sensed in each bend sensor 31-1 to 31-5 are located within a predetermined distance and are continuously arranged.

Accordingly, the sensor 120 senses an area 32 which includes all of the points, from points a1 to a5 of the bend sensor 31-1, from points b1 to b5 of the bend sensor 31-2, from points c1 to c5 of the bend sensor 31-3, from points d1 to d5 of the bend sensor 31-4, and from points e1 to e5 of the bend sensor 31-5, as one bending area.

The bending area may include a bending line. The bending line refers to a line which connects the points of sensors 31-1 to 31-5 at which the greatest resistance value is sensed in each bend area. That is, the bending line may be defined by a line that connects points at which the greatest resistance value is sensed by sensors in each bending area.

For instance, in the case of FIG. 7, a line 33 in the bending area 32, which connects the point a3 at which the greatest resistance value is output in the bend sensor 31-1, the point b3 at which the greatest resistance value is output in the bend sensor 31-2, the point c3 at which the greatest resistance value is output in the bend sensor 31-3, the point d3 at which the greatest resistance value is output in the bend sensor 31-4, and the point e3 at which the greatest resistance value is output in the bend sensor 31-5, corresponds to a bending line. FIG. 7 illustrates the bending line which is formed in the center area of the display surface in the vertical direction.

Figure 8:
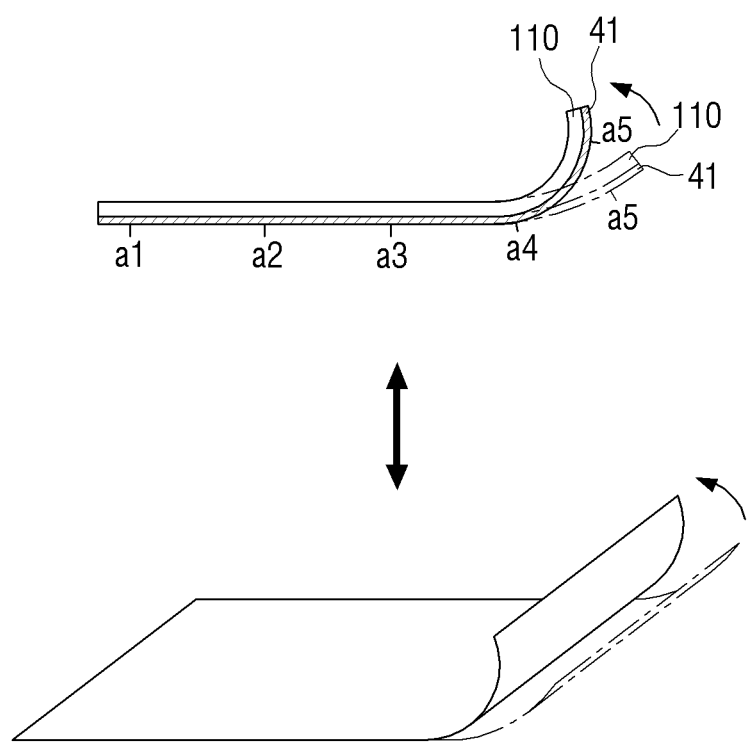
FIG. 8 is a view illustrating a method for determining a degree of bending according to an exemplary embodiment.

FIG. 8 is a view illustrating a method for determining a degree of bending according to an exemplary embodiment.

Referring to FIG. 8, the flexible display apparatus 100 determines a degree of bending of the flexible display apparatus 100, that is, a bending angle, using a change in the resistance value output from the bend sensor at a predetermined interval.

Specifically, the controller 130 calculates a difference between a resistance value of a point at which the greatest resistance value of a bend sensor is output and a resistance value output at a point which is disposed away from the point of the greatest resistance value by a predetermined distance.

The controller 130 determines a degree of bending using the calculated difference in the resistance value. Specifically, the flexible display apparatus 100 divides the degree of bending into a plurality of levels, matches each level with a resistance value of a predetermined range, and stores the matched values.

Accordingly, the flexible display apparatus 100 determines the degree of bending of the flexible display apparatus according to which level of the plurality of levels corresponds to the calculated resistance value difference.

For instance, as shown in FIG. 8, the degree of bending is determined based on a difference between a resistance value output at a point a5, where a bend sensor 41 disposed on the rear surface of the flexible display apparatus 100 outputs the greatest resistance value, and a resistance value output at a point a4, which is disposed away from the point a5 by a predetermined distance. Here, the predetermined distance is a distance between adjacent points.

Specifically, a level corresponding to the resistance value difference, which is calculated in the exemplary embodiment of FIG. 8, is identified from among the plurality of pre-stored levels, and a degree of bending is determined based on the identified level. The degree of bending may be represented by a bending angle or an intensity of bending.

When the degree of bending increases as shown in FIG. 8, the difference between the resistance value output at the point a5 and the resistance value output at the point a4 is greater than the difference of the existing resistance values. Accordingly, the controller 130 may determine that the degree of bending increases.

As described above, the flexible display apparatus 100 may be bent in different directions, a Z+ direction or a Z− direction.

Figure 9:
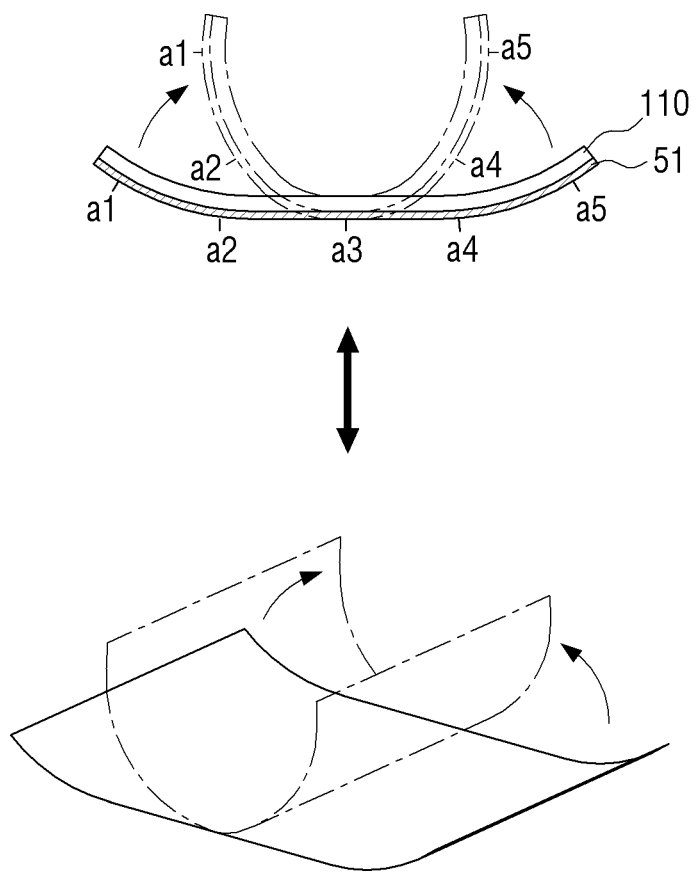
FIG. 9 is a view illustrating a method for determining a degree of bending according to an exemplary embodiment.

FIG. 9 is a view illustrating a method for determining a degree of bending according to an exemplary embodiment.

As shown in FIG. 9, a degree of bending may be determined based on a change in a bending radius R of the bend sensor 51. Since the bending radius R may be determined based on a change in the resistance value of each bend sensor as shown in FIG. 8, a detailed description is omitted.

A layout of an activation area may vary according to the bending radius R as described above.

The bending direction may be sensed in various ways. For instance, two bend sensors may be disposed on each other and the bending direction is determined based on a difference of change in the resistance value of each bend sensor. A method for sensing a bending direction using overlapping bend sensors will be explained with reference to FIGS. 10 and 11.

Figure 10:
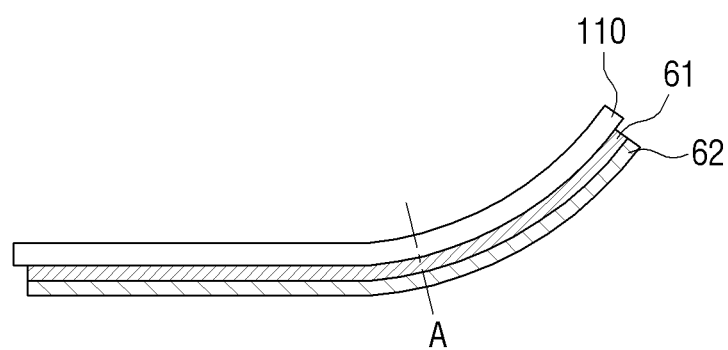
FIGS. 10 and 11 are views illustrating a method for sensing a bending direction using overlapping bend sensors.

Referring to FIG. 10, two bend sensors 61 and 62 may be disposed overlapping each other on one side of the display 110. In this case, when bending is performed in one direction Z+, different resistance values are output from the upper bend sensor 61 and the lower bend sensor 62 at a point at which the bending is performed. Accordingly, a bending direction may be determined by comparing the resistance values of the two bend sensors 61 and 62 at the same point.

Figure 11:
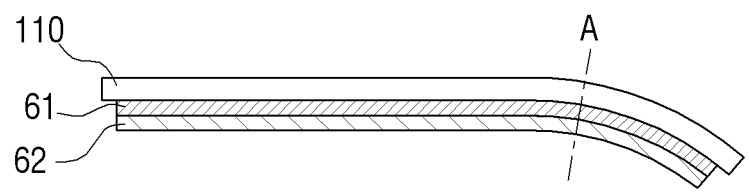

Specifically, when the flexible display apparatus 100 is bent in the Z-direction as shown in FIG. 11, tension exerted to the lower bend sensor 62 is greater than that of the upper bend sensor 61 at a point 'A' corresponding to a bending line.

On the other hand, when the flexible display apparatus 100 is bent toward the rear surface, tension exerted to the upper bend sensor 61 is greater than that of the lower bend sensor 62.

Accordingly, the controller 130 senses the bending direction by comparing the resistance values of the two bend sensors 61 and 62 at the point A.

Although the two bend sensors are disposed overlapping each other on one side of the display 110 in FIGS. 10 and 11, the bend sensors may be disposed on opposite surfaces of the display 110.

Figure 12:
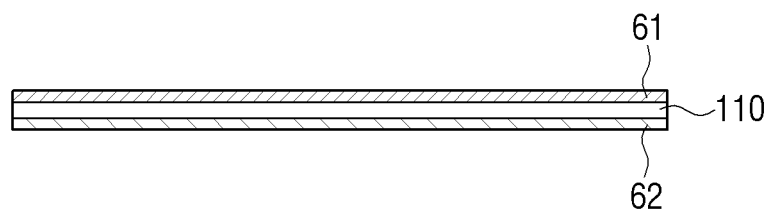
FIG. 12 is a view illustrating two bend sensors disposed on opposite surfaces of a display.

FIG. 12 illustrates the two bend sensors 61 and 62 which are disposed on the opposite surfaces of the display 110.

Accordingly, when the flexible display apparatus 100 is bent in a first direction (hereinafter, a Z+ direction) perpendicular to the screen, the bend sensor disposed on a first surface of the opposite surfaces of the display 110 is subject to a compressive force, whereas the bend sensor disposed on a second surface is subject to tension. On the other hand, when the flexible display apparatus 100 is bent in a second direction (hereinafter, a Z− direction) opposite to the first direction, the bend sensor disposed on the second surface is subject to a compressive force, whereas the bend sensor disposed on the first surface is subject to tension. As described above, the different values are detected from the two bend sensors according to the bending direction and the controller 130 determines the bending direction according to a detection characteristic of the value.

Although the bending direction is sensed using the two bend sensors in FIGS. 10 to 12, the bending direction may be sensed by means of only a strain gage disposed on one surface of the display 110. That is, a compressive force or tension is exerted on the strain gage disposed on one surface according to a bending direction, and thus a bending direction can be determined by identifying a characteristic of the output value.

Figure 13:
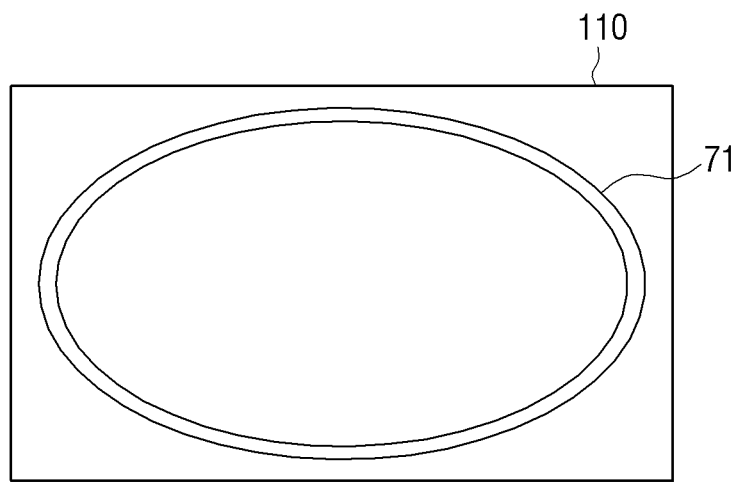
FIG. 13 is a view illustrating an example of a configuration of a single bend sensor disposed on one surface of a display to sense bending.

FIG. 13 is a view illustrating an example of a single bend sensor disposed on one surface of the display 110 to sense bending. Referring to FIG. 13, a bend sensor 71 may be implemented in a form of a looped curve forming a circle, a quadrangle, or other polygons, and may be disposed along an edge of the display 110. The controller 130 may determine a point at which a change in an output value of the looped curve is sensed to be a bending area. The bend sensor may be connected to the display 110 in a form of an open curve such as an S shape, a Z shape, or a zigzag shape.

Figure 14:
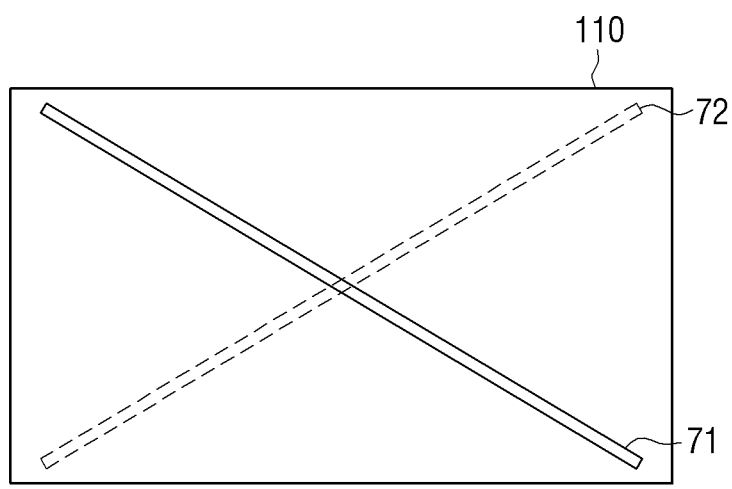
FIG. 14 is a view illustrating two bend sensors which intersect.

FIG. 14 is a view illustrating two intersecting bend sensors. Referring to FIG. 14, a first bend sensor 71 is disposed on a first surface of the display 110 and a second bend sensor 72 is disposed on a second surface of the display 110. The first bend sensor 71 is disposed on the first surface of the display 110 in a first diagonal direction, and the second bend sensor 72 is disposed on the second surface in a second diagonal direction. Accordingly, output values and output points of the first and second bend sensors 71 and 72 are changed according to various bending conditions, such as a case in which each corner is bent, a case in which each edge is bent, a case in which a center is bent, and a case in which folding or rolling is performed. Accordingly, the controller 130 may determine which type of deformation is performed according to a characteristic of the output value.

Although line type bend sensors are used in the above-described various exemplary embodiments, bending may be sensed using a plurality of separate strain gages.

Figure 15:
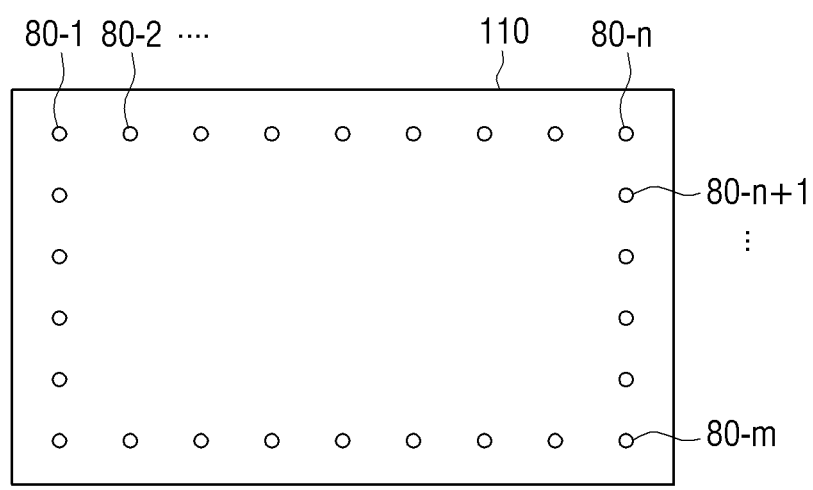
FIG. 15 is a view illustrating a method for sensing bending using a plurality of strain gages.

FIG. 15 is a view illustrating a method for sensing bending using a plurality of strain gages. The strain gage uses metal or a semiconductor in which a resistance is greatly changed according to an applied force, and senses deformation of a surface of an object to be measured according to a change in the resistance value. It is common that a material such as metal increases a resistance value if length of the metal is stretched by an external force, and decreases the resistance value if the length is contracted. Accordingly, it is determined whether bending is performed by sensing a change in the resistance value.

Referring to FIG. 15, a plurality of strain gages are arranged along an edge of the display 110. The number of strain gages may be changed according to a size and a shape of the display 110, or a predetermined bending sensing resolution, etc.

In the state in which the strain gages are arranged as shown in FIG. 15, a user may bend a certain point in an arbitrary direction. Specifically, when a certain corner is bent, a force is exerted to a strain gage overlapped with a bending line from among strain gages 80-1 to 80-*n* arranged in a horizontal direction. Accordingly, an output value of the corresponding strain gage increases in comparison with output values of the other strain gages. Also, a force is exerted on a strain gage overlapped with the bending line from among strain gages 80-*n*, 80-*n*+1 to 80-*m* arranged in a vertical direction, and thus an output value is changed. The controller 130 determines that a line connecting the two strain gages in which the output values are changed is a bending line.

Unlike in FIGS. 11 to 15, the flexible display apparatus 100 may sense a bending direction using various sensors such as a gyro sensor, a geomagnetic sensor, and an acceleration sensor, etc.

Figure 16:
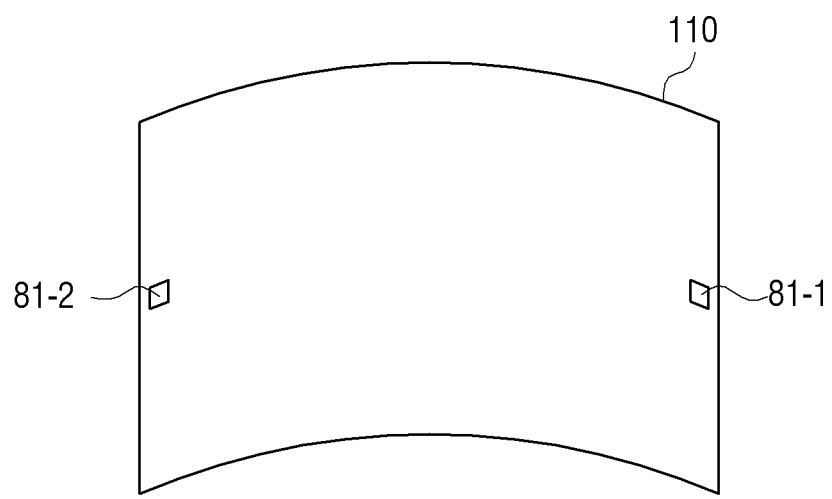
FIG. 16 is a view illustrating a method for sensing a bending direction using an acceleration sensor.

FIG. 16 is a view illustrating a method for sensing a bending direction using an acceleration sensor. Referring to FIG. 16, the flexible display apparatus 100 includes a plurality of acceleration sensors 81-1 and 81-2.

The acceleration sensors 81-1 and 81-2 measure acceleration of a motion and a direction of the acceleration. Specifically, the acceleration sensors 81-1 and 81-2 output a sensing value corresponding to acceleration of gravity which changes according to a slope of an apparatus where those sensors are attached. Accordingly, when the acceleration sensors 81-1 and 81-2 are disposed on opposite edges of the flexible display apparatus, output values sensed by the acceleration sensors 81-1 and 81-2 are changed when the flexible display apparatus 100 is bent. The controller 130 calculates a pitch angle and a roll angle using the output values sensed by the acceleration sensors 81-1 and 81-2. Accordingly, the controller 130 may determine a bending direction based on changes in the pitch angle and the roll angle sensed by the acceleration sensors 81-1 and 81-2.

In FIG. 16, the acceleration sensors 81-1 and 81-2 are disposed on opposite edges in the horizontal direction with reference to the front surface of the flexible display apparatus 100. However, the acceleration sensors 81-1 and 81-2 may be disposed in the vertical direction. In this case, when the flexible display apparatus 100 is bent in the vertical direction, a bending direction is sensed according to measurement values sensed by the acceleration sensors 81-1 and 81-2 in the vertical direction.

According to another exemplary embodiment, the acceleration sensors may be disposed all of the left, right, upper and right edges and/or may be disposed on corners.

As described above, a bending direction may be sensed using a gyro sensor or a geomagnetic sensor besides the acceleration sensor. The gyro sensor refers to a sensor which, if a rotational motion occurs, detects an angular velocity by measuring Coriolis' force exerted in a velocity direction of the motion. Based on a measurement value of the gyro sensor, a direction of the rotational motion can be sensed and thus a bending direction can also be sensed. The geomagnetic sensor refers to a sensor which senses azimuth using a t-axis or 3-axis fluxgate. When such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various bending characteristics, such as a bending area and a bending direction, can be determined.

As described above, the flexible display apparatus 100 may sense bending using various kinds of sensors. The above-described configurations and sensing methods may be applied to the flexible display apparatus 100 individually or may be applied in combination.

The sensor 120 may sense a user's touch manipulation on a screen of the display 110 in addition to sensing the bending.

Specifically, the sensor 120 may sense a touch using capacitive overlay, resistive overlay, infrared beam, surface acoustic wave, integral strain gauge, and piezo electric.

The capacitive overlay refers to a method that senses a location by sensing a change in capacitance when a user touches a screen with his/her finger.

A pressing operation may cause upper and lower surfaces to contact each other and thus change resistance values. At this time, a voltage may be changed due to current flowing in opposite ends. The resistive overlay refers to a method that senses a contact location using a change in the voltage.

The infrared beam refers to a method that senses a location using the principle that, when the user touches a screen of an opto-matrix frame-mounted monitor with an article capable of blocking light, such as a finger, light emitted from an infrared ray emitting diode is blocked and is not detected by an opposite photo transistor.

The surface acoustic wave refers to a method that is implemented in a simple principle using propagation characteristics of sound that ultrasonic waves are propagated along a surface and advance by a predetermined distance within a predetermined time, and that senses a time interval of a sound which is reflected and received through a transmitter and a reflector.

If the user presses one corner with a hand, a strain measuring apparatus of the pressed corner is subject to the greatest force from among the strain measuring apparatuses provided at the four corners, and an electric signal is changed according the degree of increased force and is transmitted to a controller. The integral strain gauge refers to a method in which the controller calculates coordinate values using a ratio of electric signals of the four corners.

When the user touches a screen, four corners of the screen are subject to different degrees of pressure according to a degree of pressure at the touch point and a touch location.

The piezo electric refers to a method that senses a touch location by calculating a ratio of electric signals of the four corners.

For instance, the sensor 120 may include a transparent conductive oxide film such as an indium-tin oxide (ITO) deposited on the substrate 111 of the display 110, and a film formed on an upper portion of the transparent conductive oxide film. Accordingly, when the user touches the screen, upper and lower plates at the touched point are brought into contact with each other and an electric signal is transmitted to the controller 130. The controller 130 recognizes the touched point using coordinates of an electrode to which the electric signal is transmitted. The touch sensing method is disclosed in various prior arts and thus a redundant explanation is omitted.

When a bending input is sensed in a screen inactivation state, the controller 130 may activate the bending area which is divided by the bending line, and, when a bending input is sensed in a screen activation state, the controller 130 may deactivate the bending area which is divided by the bending line. The detailed functions of the controller 130 have been described above and thus a detailed description thereof is omitted.

Figure 17:
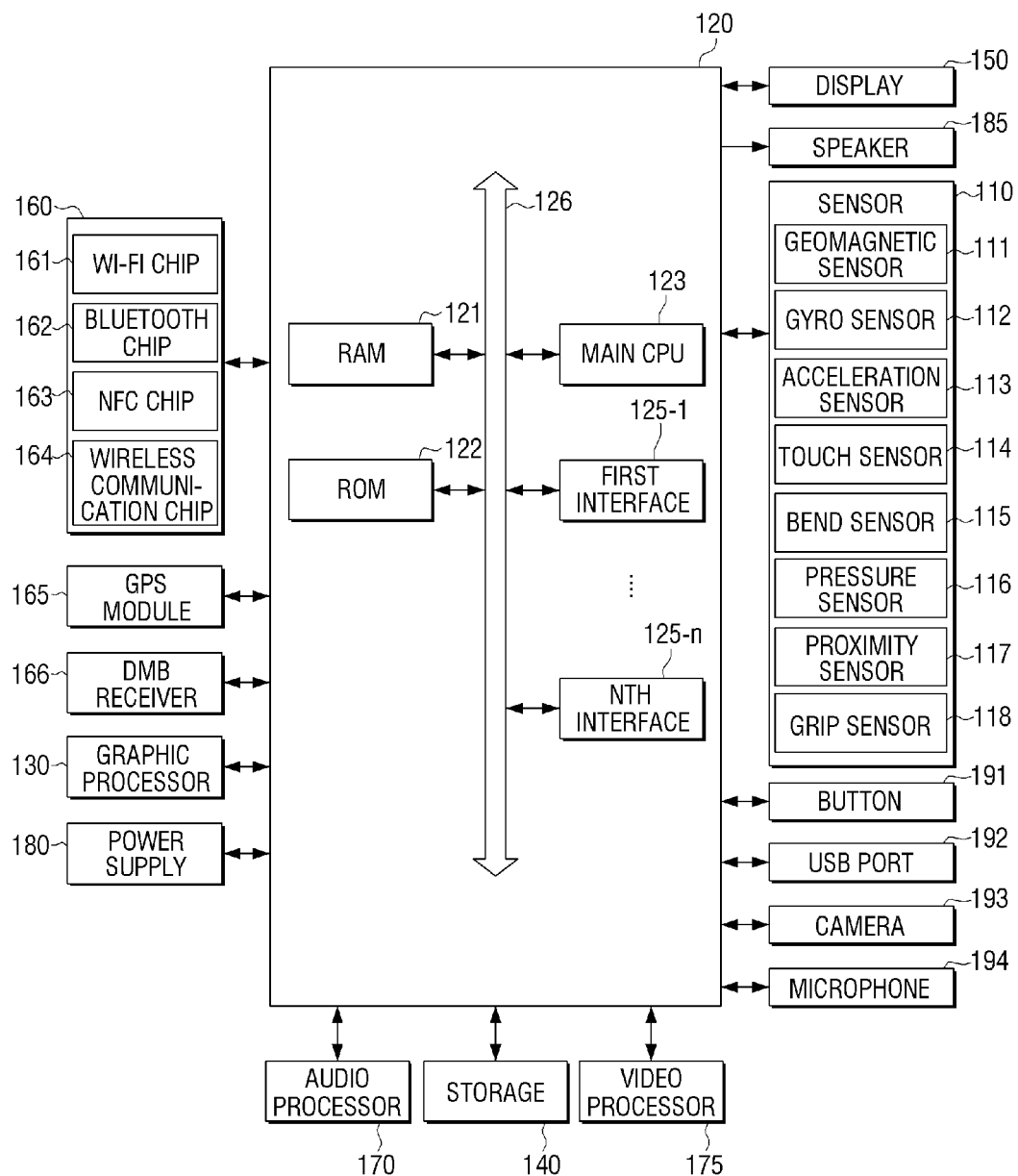
FIG. 17 is a block diagram illustrating a configuration of a flexible display apparatus according to various exemplary embodiment.

FIG. 17 is a block diagram illustrating an example of a detailed configuration of a flexible display apparatus according to various exemplary embodiments.

Referring to FIG. 17, a flexible display apparatus 100 includes a display 110, a sensor 120, a controller 130, a storage 140, a communicator 150, a voice recognizer 160, a motion recognizer 170, a speaker 180, external input ports 190-1-190-n, and a power supply 500.

The display 110 may be flexible. The detailed configuration and operation of the display 110 have been described above and thus a redundant explanation is omitted.

The storage 140 may store various programs or data associated with the operation of the flexible display apparatus 100, setting information set by the user, system operating software, and various application programs.

The storage 140 may store information on the above-described plurality of functions and information on priority given to the plurality of functions.

Also, the storage 140 may store information on at least one function matching each area of the display 110. Also, the storage 140 may store information on priority given to each function.

The sensor 120 detects a user manipulation of the flexible display apparatus 100 including the display 110, in particular, a deformation manipulation and a touch manipulation. Referring to FIG. 17, the sensor 120 may include various kinds of sensors such as touch sensor 121, a geomagnetic sensor 122, an acceleration sensor 123, a bend sensor 124, a pressure sensor 125, a proximity sensor 126, and a grip sensor 127, etc.

The touch sensor 121 may be implemented by using a capacitive type or a resistive type of sensor. The capacitive type calculates touch coordinates by sensing minute electricity excited in a user's body when a part of the user's body touches the surface of the display 110, using a dielectric substance coated on the surface of the display 110. The resistive type includes two electrode plates, and, when a user touches a screen, calculates touch coordinates by sensing an electric current flowing due to contact between upper and lower plates at the touched point. Besides these, infrared beam, surface acoustic wave, integral strain gauge, and piezo electric may be used to sense a touch manipulation.

The infrared beam refers to a method that senses a location using the principle that, when the user touches a screen of an opto-matrix frame-mounted monitor with an article capable of blocking light such as a finger, light emitted from an infrared ray emitting diode is blocked and is not detected by an opposite photo transistor.

The surface acoustic wave refers to a method that is implemented in a simple principle using propagation characteristics of sound that ultrasonic waves are propagated along a surface and advance by a predetermined distance within a predetermined time, and that senses a time interval of a sound which is reflected and received through a transmitter and a reflector.

If the user presses one corner with a hand, a strain measuring apparatus of the pressed corner is subject to the greatest force from among the strain measuring apparatuses provided at the four corners, and an electric signal is changed according the degree of increased force and is transmitted to a controller. The integral strain gauge refers to a method in which the controller calculates a touch location by calculating a ratio of electric signals of the four corners.

When the user touches a screen, four corners of the screen are subject to different degrees of pressure according to a degree of pressure at the touch point and a touch location. The piezo electric refers to a method in which the controller calculates coordinate values by calculating a ratio according to a degree of pressure.

As described above, the touch sensor 121 may be implemented in various forms.

The geomagnetic sensor 122 senses a rotation state and a moving direction of the flexible display apparatus 100. The acceleration sensor 123 senses a degree of tilt of the flexible display apparatus 100. The geomagnetic sensor 122 and the acceleration sensor 123 may be used to sense bending characteristics, such as a bending direction or a bending area of the flexible display apparatus 100, as described above. However, the geomagnetic sensor 122 and the acceleration sensor 123 may be used to sense a rotation state or a tilt state of the flexible display apparatus 100.

The bend sensor 124 may be embodied in various shapes and numbers as described above, and may sense a bending state of the flexible display apparatus 100. The configuration and operation of the bend sensor 124 has been described above and thus a redundant explanation is omitted.

The pressure sensor 125 senses a magnitude of pressure exerted to the flexible display apparatus 100 when the user performs a touch or bending manipulation, and provides the magnitude of pressure to the controller 130. The pressure sensor 125 may include a piezo film embedded in the display 110 and outputs an electric signal corresponding to the magnitude of pressure. Although the pressure sensor 125 is a separate element from the touch sensor 121 in FIG. 17, when the touch sensor 121 is implemented by using a resistive touch sensor, the resistive touch sensor may also perform the function of the pressure sensor 125.

The proximity sensor 126 senses an object which approaches without directly contacting the display surface. The proximity sensor 126 may be implemented by using various types of sensors, such as a high-frequency oscillation type proximity sensor which forms a high frequency magnetic field and detects an electric current induced by a magnetic characteristic which is changed when an object approaches, a magnetic type proximity sensor which uses a magnet, a capacitive type proximity sensor which detects capacitance that changes when an object approaches, a photoelectric type proximity sensor, an ultrasonic wave type proximity sensor, etc.

The grip sensor 127 is disposed on a border or a handle of the flexible display apparatus 100 separately from the pressure sensor 125, and senses a user's grip. The grip sensor 127 may be implemented by using a pressure sensor or a touch sensor.

The controller 130 analyzes various sensing signals sensed by the sensor 120, when it is determined that a bending manipulation is performed, determines an activation area and an inactivation area with reference to a bending line, and displays a corresponding screen on the activation area.

For example, the controller 130 may process data which is obtained by communicating with an external apparatus, or data which is stored in the storage 140, and may output the processed data through the activation area of the display 110 and the speaker 180. In this case, the controller 130 may communicate with the external apparatus using the communicator 150.

The communicator 150 may communicate with various types of external apparatuses according to various communication methods. The communicator 150 may include various communication modules, such as a broadcast receiving module 151, a short-range wireless communication module 152, a GPS module 153, and a wireless communication module 154. The broadcast receiving module 151 may include a terrestrial broadcast receiving module (not shown) including an antenna to receive a terrestrial broadcast signal, a demodulator, and an equalizer, and a digital multimedia broadcasting (DMB) module to receive and process a DMB broadcast signal. The short-range wireless communication module 152 is a module that communicates with an external apparatus located nearby according to a short-range wireless communication method such as near field communication (NFC), Bluetooth, or Zigbee, etc. The GPS module 153 is a module that receives a GPS signal from a GPS satellite and detects a current location of the flexible display apparatus 100. The wireless communication module 154 is a module that is connected to an external network according to a wireless communication protocol such as Wi-Fi or IEEE etc. and communicates with the external network. The communicator 150 may further include a mobile communication module that accesses a mobile communication network and performs communication according to various mobile communication standards such as $3^{rd}$ generation (3G), $3^{rd}$ generation partnership project (3GPP), and long term evolution (LTE).

The controller 130 may control the communicator 150 to receive a content from an external apparatus or transmit a content to an external apparatus according to a function which is performed in the activation area.

The controller 130 may recognize a voice input or a motion input besides the bending or touch manipulation, and may perform an operation corresponding to the input. In this case, the controller 130 may activate the voice recognizer 160 or the motion recognizer 170.

The voice recognizer 160 collects a user's voice or an external sound using a voice obtaining means, such as a microphone (not shown), and transmits the user's voice or the external sound to the controller 130. When the user's voice is consistent with a pre-set voice command in a voice control mode, the controller 130 may perform a task corresponding to the user's voice.

The motion recognizer 170 obtains a user's image using an image picking up means (not shown), such as a camera, and provides the user's image to the controller 130. When the controller 130 analyzes the user's image and determines that the user makes a motion gesture corresponding to a pre-set motion command in a motion control mode, the controller 130 performs an operation corresponding to the motion gesture.

For example, various tasks such as zapping a channel, turning on an apparatus, turning off, pausing, reproducing, stopping, rewinding, fast forwarding, mute, etc. may be controlled according to a voice or a motion. However, this should not be considered as limiting.

The external input ports 1, 2, . . . , n 190-1~190-n may be connected to various types of external apparatuses and may receive various data or programs or control commands. Specifically, the external input ports may include USB ports, headset ports, mouse ports, and LAN ports, etc. The power supply 500 (e.g., a battery) supplies power to the elements of the flexible display apparatus 100. The power supply 500 may be implemented by including an anode collector, an anode electrode, an electrolyte, a cathode electrode, a cathode collector, and a sheath enclosing the aforementioned members. The power supply 500 may be implemented by using a secondary cell which is chargeable and dischargeable. The power supply 500 may be implemented in a flexible form so that the power supply 500 can be bent along with the flexible display apparatus 100. In this case, the collector, the electrode, the electrolyte, and the sheath may be made of a flexible material. A detailed configuration and material of the power supply 500 will be explained separately below.

Although FIG. 17 illustrates various elements which may be included in the flexible display apparatus 100, the flexible display apparatus 100 may not necessarily include all of the elements and may not include only the above elements. Therefore, some of the elements may be omitted or added according to a product type of the flexible display apparatus 100, or may be replaced with other elements.

The controller 130 may control the elements according to a user's manipulation which is recognized through the sensor 120, the voice recognizer 160, and the motion recognizer 170 described above, and may perform various operations.

Figure 18:
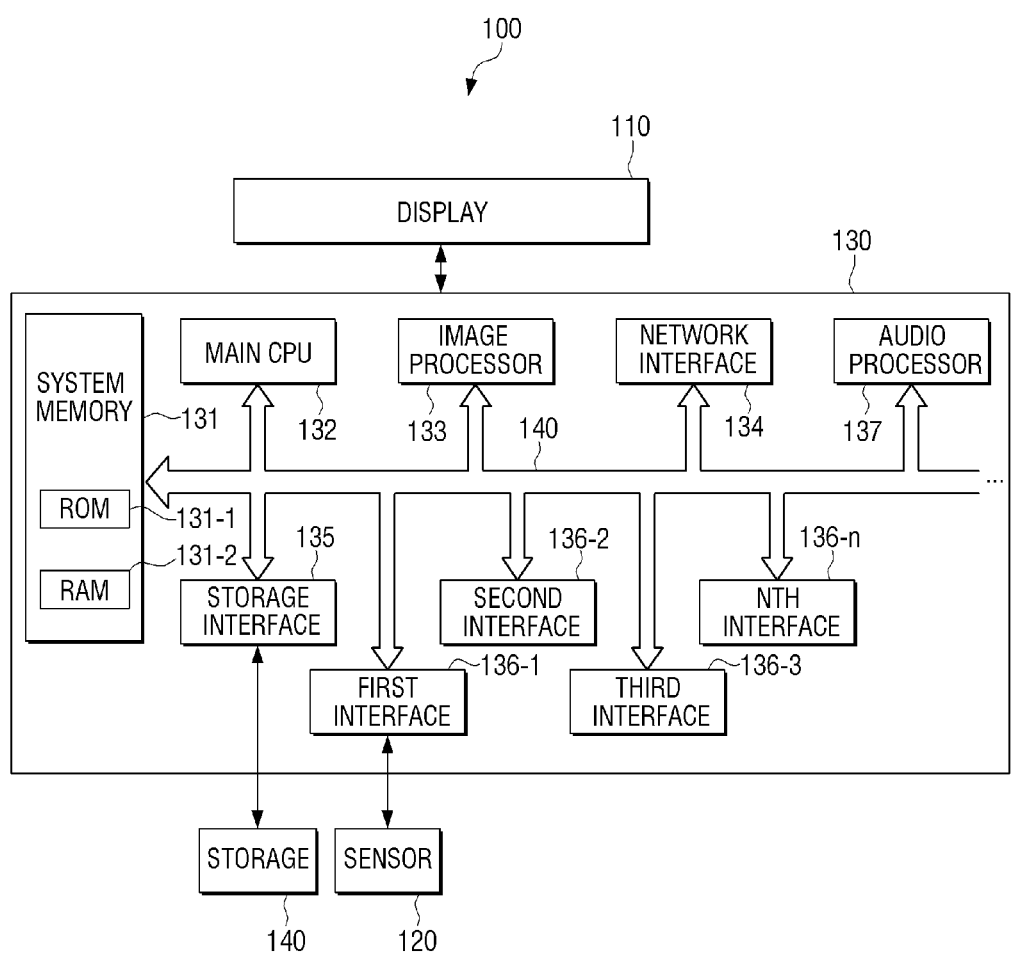
FIG. 18 is a block diagram illustrating a detailed configuration of the controller of FIG. 17.

FIG. 18 is a view to explain a detailed configuration of the controller shown in FIG. 17.

Referring to FIG. 18, the controller 130 may include a system memory 131, a main CPU 132, an image processor 133, a network interface 134, a storage interface 135, first to n-th interfaces 136-1 to 136-n, an audio processor 137, and a system bus 140.

The system memory 131, the main CPU 132, the image processor 133, the network interface 134, the storage interface 135, the first to n-th interfaces 136-1 to 136-n, and the audio processor 137 may be connected to one another through the system bus 140, and may exchange various data or signals with one another.

The first to n-th interfaces 136-1 to 136-n support interfacing between the elements including the sensor 120 and the elements of the controller 130. In FIG. 18, the sensor 120 is connected to only the first interface 136-1. However, when the sensor 120 includes various types of sensors as shown in FIG. 17, each of the sensors may be connected through each interface. Also, at least one of the first to n-th interfaces 136-1 to 136-n may be implemented by using a button which is provided on a body of the flexible display apparatus 100, or an input interface which receives various signals from an external apparatus which is connected through the external input ports 1 to n.

The system memory 131 includes a read only memory (ROM) 131-1 and a random access memory (RAM) 131-2. The ROM 131-1 stores a set of commands for system booting. When a turn on command is input and power is supplied, the main CPU 132 copies an OS which is stored in the storage 140 into the RAM 131-2 according to a command stored in the ROM 131-1, executes the OS, and boots the system. When booting is completed, the main CPU 132 copies various applications stored in the storage 140 into the RAM 131-2, executes the applications copied into the RAM 131-2, and performs various operations.

As described above, the main CPU 132 may perform various operations according to the application stored in the storage 140.

The storage interface 135 is connected to the storage 140 and exchanges various programs, content, and data with the storage 140.

For example, when an activation area is determined according to a user's bending manipulation, the main CPU 132 accesses the storage 140 through the storage interface 135, identifies stored information, and performs a function corresponding to the activation area, for example, a moving image playback function. In this state, when the user selects one content, the main CPU 132 executes a moving image playback program which is stored in the storage 140. The main CPU 132 controls the image processor 133 to form a moving image playback screen according to a command included in the moving image playback program.

The image processor 133 may include a decoder, a renderer, and a scaler. Accordingly, the image processor 133 decodes a stored content, renders the decoded content data and forms a frame, and scales a size of the frame according to a screen size of the display 110. The image processor 133 provides the processed frame to the display 110 and displays the same.

The audio processor 137 refers to an element that processes audio data and provides the audio data to a sound outputting means, such as a speaker 180. The audio processor 137 performs audio signal processing by decoding audio data which is stored in the storage 140 or audio data which is received through the communicator 150, filtering noise, and amplifying the audio data to an appropriate decibel. In the above example, when the content to be reproduced is a moving image content, the audio processor 137 may process the audio data which is de-multiplexed from the moving image content, and may provide the audio data to the speaker 180 so that the audio data is synchronized with the image processor 133 and is output.

The network interface 134 is connected to external apparatuses through a network. For example, when a web browser program is executed, the main CPU 132 accesses a web server through the network interface 134. When web page data is received from the web server, the main CPU 132 controls the image processor 133 to form a web page screen, and displays the web page screen on the display 110.

As described above, when a deformation of the flexible display apparatus 100, the controller 130 detects a bending line according to the sensed bending manipulation, determines an active area and an inactive area with reference to the bending line, and performs an operation corresponding to each area. The above-described operation of the controller 130 may be implemented by executing various programs stored in the storage 140.

Figure 19:
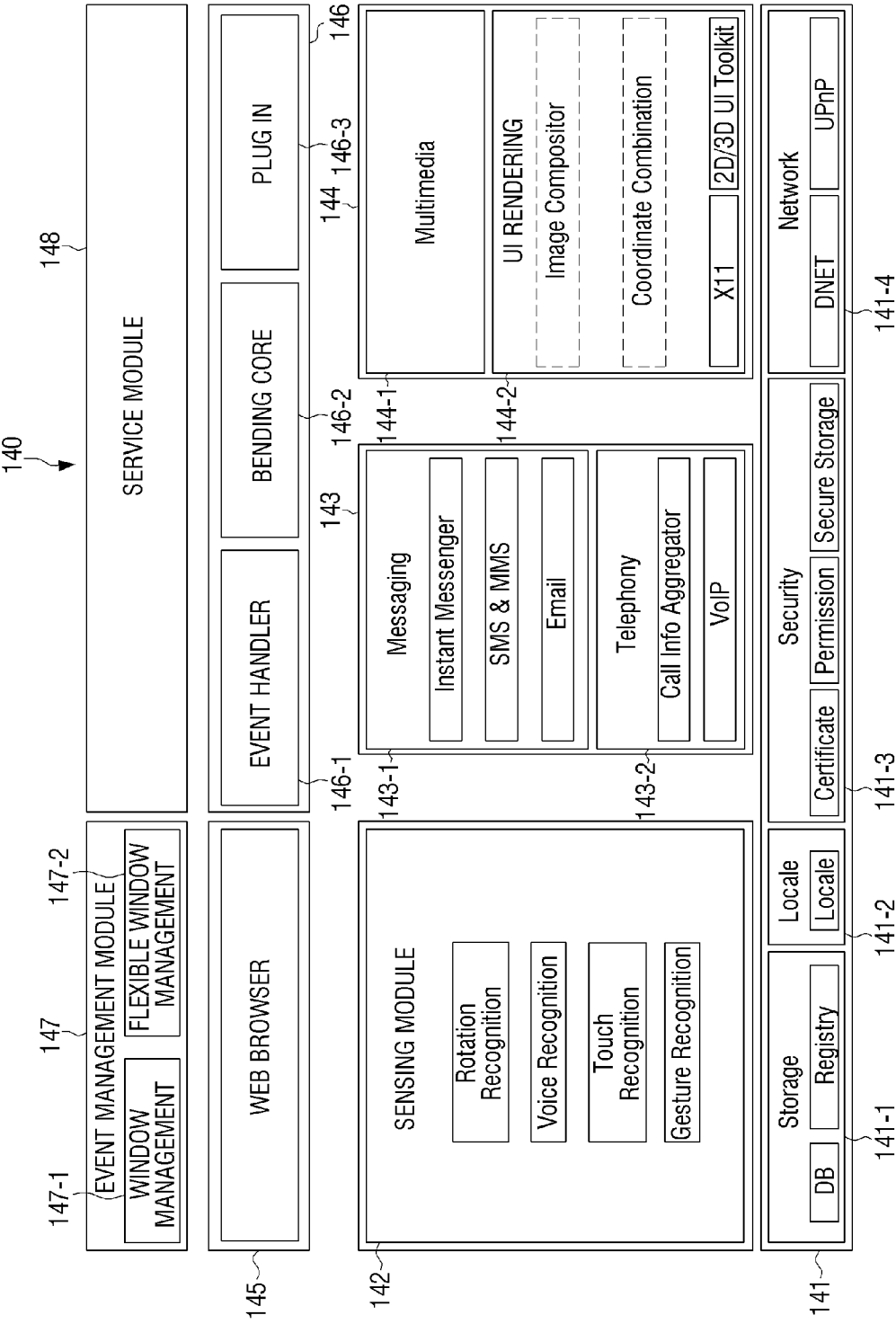
FIG. 19 is a view illustrating a software structure according to various exemplary embodiments.

FIG. 19 is a view illustrating a software supporting the operations of the controller 130 according to the above-described exemplary embodiments. Referring to FIG. 19, the storage 140 includes a base module 1910, a device management module 1920, a communication module 1930, a presentation module 1940, a web browser module 1950, and a service module 1960.

The base module 1910 is a module that processes signals transmitted from each hardware element that is included in the flexible display apparatus 100, and transmits the signals to an upper layer module.

The base module 1910 includes a storage module 1911, a location-based module 1912, a security module 1913, and a network module 1914.

The storage module 1911 is a program module that manages a database (DB) or a registry. The location-based module 1912 is a program module that is interlocked with hardware, such as a GPS chip, and supports a location-based service. The security module 1913 is a program module that supports certification for hardware, permission of a request, and a secure storage, and the network module 1914 includes a Distributed.net (DNET) module and a Universal Plug and Play (UPnP) module as a module for supporting network connection.

The device management module 1920 is a module that manages external input and information on an external device, and uses the same. The device management module 1920 may include a sensing module 1921, a device information management module 1922, and a remote control module 1923.

The sensing module 1921 is a module that analyzes sensor data provided from various sensors of the sensor 120. Specifically, the sensing module 1921 is a program module that detects a location of a user or an object, color, shape, size, and other profiles, etc. The sensing module 1921 may include a face recognition module, a voice recognition module, a motion recognition module, and an NFC recognition module. The device information management module 1922 is a module that provides information on various types of devices, and the remote control module 1923 is a program module that remotely controls a peripheral device, such as a telephone, a television (TV), a printer, a camera, and an air conditioner, etc.

The communication module 1930 is a module configured to communicate with an external apparatus. The communication module 1930 includes a messaging module 1931, such as a messenger program, a short message service (SMS) and multimedia message service (MMS) program, and an email program, etc., and a telephony module 1932 which includes a call information aggregator program module and a voice over internet protocol (VoIP) module.

The presentation module 1940 is a module that generates a display screen. The presentation module 1940 includes a multimedia module 1941 configured to reproduce multimedia content and output the multimedia content, and a user interface (UI) and graphic module 1942 configured to process a UI and graphics. The multimedia module 1941 may include a player module, a camcorder module, and a sound processing module. Accordingly, the multimedia module 1941 generates a screen and a sound by reproducing various multimedia contents, and reproduces the same. The UI and graphic module 1942 may include an image compositor module 1942-1 to combine images, a coordinate combination module 1942-2 to combine coordinates on a screen to display an image and generate coordinates, an X11 module 1942-3 to receive various events from hardware, and a 2D/3D UI toolkit 1942-4 to provide a tool for configuring a UI of a 2D or 3D format.

The web browser module 1950 is a module that performs web-browsing and accesses a web server. The web browser module 1950 may include a web view module to render and view a web page, a download agent module to download, a bookmark module, and a web-kit module, etc.

The service module 1960 is an application module that provides various services. Specifically, the service module 1960 may include various modules, such as a navigation service module to provide a map, a current location, a landmark, and route information, a game module, and an advertisement application module.

The main CPU 132 of the controller 130 accesses the storage 140 through the storage interface 135, copies various modules stored in the storage 140 into the RAM 131-2, and performs operations according to operations of the copied modules.

Specifically, the main CPU 132 analyzes output values of the sensors of the sensor 120 using the sensing module 1921, detects a bending line, and determines an activation area based on the detected bending line. When the activation area is determined, the main CPU 132 detects information on a function corresponding to the determined activation area from a database of the storage module 1910. The main CPU 132 drives a module corresponding to the detected information and performs an operation.

For example, when the operation is displaying a graphic user interface (GUI), the main CPU 132 configures a GUI screen using the image compositor module 1942-1 of the presentation module 1940. Also, the main CPU 132 determines a display location of the GUI screen using the coordinate combination module 1942-2 and controls the display 110 to display the GUI screen on the location.

When user's manipulation corresponding to a message receiving operation is performed, the main CPU 132 executes the messaging module 1941, accesses a massage management server, and receives a message stored in a user account. Also, the main CPU 132 configures a screen corresponding to the received message using the presentation module 1940 and displays the screen on the display 140.

When a telephone call is performed, the main CPU 132 may drive the telephony module 1932.

As described above, programs of various structures may be stored in the storage 140 and the controller 130 may perform various operations using various programs stored in the storage 140.

In the above-described exemplary embodiments, the flexible display apparatus 100 includes the CPU. However, this is merely an example. That is, the flexible display apparatus 100 may be implemented in the form of e-paper having only a simple display function. The e-paper has low power consumption and may be implemented in the form of having a low computing function. Also, the e-paper may be implemented in the form of a display which is interlocked with a high performance external apparatus such as a smartphone, and receives information on the external apparatus and displays the information. Such e-paper may be used as e-newspaper, e-magazine, and e-book. However, only the functions that are executable when the flexible display apparatus 100 is e-paper may be applied as functions according to various rubbing gestures according to exemplary embodiments.

Figure 20:
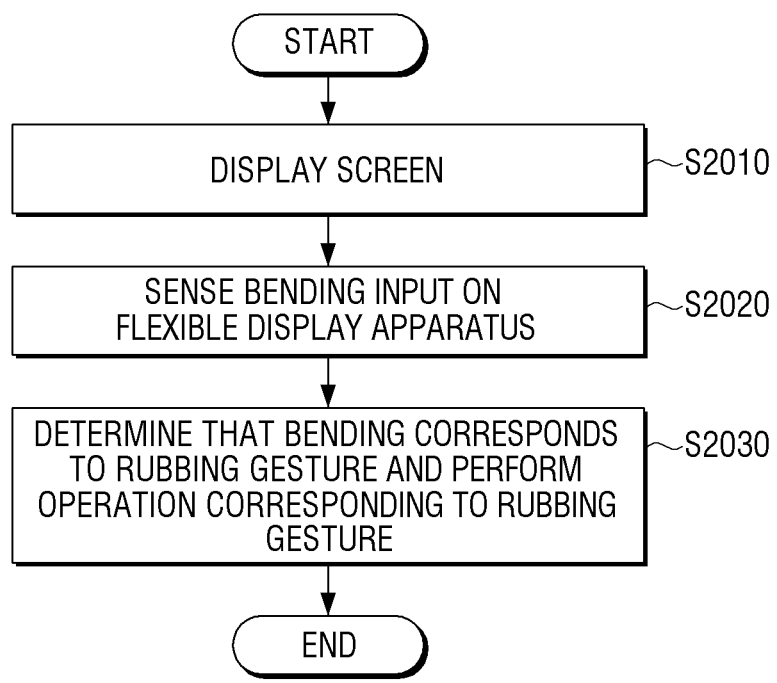
FIG. 20 is a view illustrating a display method of a flexible display apparatus according to an exemplary embodiment.

FIG. 20 is a view illustrating a display method of a flexible display apparatus according to an exemplary embodiment.

According to the display method of the flexible display apparatus shown in FIG. 20, the flexible display apparatus 100 displays a screen (S2010).

Next, the flexible display apparatus 100 senses a deformation of the flexible display apparatus 100 (S2020).

When it is determined that the deformation is a rubbing gesture of rubbing a plurality of different areas on a screen based on a result of sensing in operation S2020, the flexible display apparatus 100 performs an operation corresponding to the rubbing gesture (S2030). The plurality of areas may be areas that are divided by a bending line which is formed by the bending input.

When the bending line is sensed as being continuously moved within a predetermined area more than predetermined number of times for a predetermined period of time in operation S2020, it is determined that the rubbing gesture is performed.

Also, when a first pattern in which the bending line is moved from a first location to a second location on the screen and then returns to the first location or a location close to the first location is repeated at least once in operation S2020, it is determined that the rubbing gesture is performed.

Also, when a contact area between first and second areas which are divided by the bending line is continuously changed within a predetermined time range in operation S2020, it is determined that the rubbing gesture is performed.

Also, when it is determined that the rubbing gesture is performed, the flexible display apparatus 100 may perform a function that is related to an object displayed on at least one of the plurality of areas divided by the bending line in operation S2030.

Also, when it is determined that the rubbing gesture is performed, the flexible display apparatus 100 may delete an object which is displayed on one of the plurality of areas divided by the bending line or may move the object to another area and display the object in operation S2030.

Also, when it is determined that the rubbing gesture is performed, the flexible display apparatus 100 may copy an object which is displayed on one of the plurality of areas into another area and display it in operation S2030.

Also, when it is determined that the rubbing gesture is performed, the flexible display apparatus 100 may store information on an object which is displayed on one of the plurality of areas in a storage space corresponding to another area from among the plurality of areas in operation S2030.

Also, when it is determined that the rubbing gesture is performed, the flexible display apparatus 100 may display detailed information on an object which is displayed on one of the plurality of areas in operation S2030.

Also, when it is determined that a whole rubbing gesture for which each of the plurality of areas occupies an area larger than a predetermined area is performed, the flexible display apparatus 100 may perform a predetermined function with respect to all contents which are displayed on the screen or all content which are executed on the screen in operation S2030.

Also, when it is determined that a partial rubbing gesture for which at least one of the plurality of areas occupies an area smaller than a predetermined area is performed, the flexible display apparatus 100 may perform a predetermined function with respect to some contents which are displayed on the area where the partial rubbing gesture is performed or some contents which are executed on the corresponding area in operation S2030.

Also, the flexible display apparatus 100 may provide a feedback effect on the rubbing gesture to distinguish the object which is determined as being rubbed from the other objects in operation S2030.

Also, in operation S2030, the flexible display apparatus 100 may provide at least one of a graphic effect, a sound effect, and a haptic effect to the object or around the object, or may provide at least one of the graphic effect, the sound effect, and the haptic effect to the area where the rubbing gesture is performed.

FIG. 21 is a view illustrating an operation of a rubbing gesture according to an exemplary embodiment.

View (a) of FIG. 21 is a view illustrating a partial rubbing gesture which is performed after a certain area of the flexible display apparatus 100 is bent.

As shown in view (a) of FIG. 21, when the user bends an area of the flexible display apparatus 100, along bending line BL, that is smaller than a predetermined area and presses the area, performs a rubbing manipulation in an A direction and then performs a rubbing manipulation in a B direction, and then alternates the rubbing manipulation of the A direction and the rubbing manipulation of the B direction more than a predetermined number of times, this gesture may be a partial rubbing gesture according to an exemplary embodiment. The A direction and the B direction may be opposite to each other.

As shown in view (b) of FIG. 21, when the user bends an area of the flexible display apparatus 100 that is larger than a predetermined area and presses the area, performs a rubbing manipulation in a C direction and then performs a rubbing manipulation in a D direction, and then alternates the rubbing manipulation of the C direction and the rubbing manipulation of the D direction more than a predetermined number of times, this gesture may be a whole rubbing gesture according to an exemplary embodiment. The C direction and the D direction may be opposite to each other.

As described above, the partial rubbing gesture and the whole rubbing gesture may be distinguished from each other with reference to a ratio of the area where the bending manipulation is performed for the rubbing manipulation to the whole screen area, as shown in views (a) and (b) of FIG. 21.

FIG. 22 is a view illustrating a method for dividing an area according to an exemplary embodiment.

As shown in view (a) of FIG. 22, it is assumed that an area A1 is bent, along bending line BL1, by a rubbing gesture and then an area A2 is bent, along a bending line BL2.

When the area A1 is bent, objects 221, 222, and 223 are located in the area A1 divided by bending line BL1 as shown in the first drawing, and, when the area A2 is bent, the objects 222 and 223 are located in the area A2 divided by bending line BL2 and the object 221 is located in the other area as shown in the second drawing. In this case, when a function corresponding to the rubbing gesture is applied, the object 221 may be classified as an object belonging to an area that has its location changed due to the bending with reference to the first bending manipulation.

For example, when a function of deleting an object displayed on the area that has its location changed is performed by the rubbing gesture as shown in view (b) of FIG. 22, the object 221 may be classified as an object belonging to the area that has its location changed due to the bending and may be deleted according to the rubbing gesture.

However, the exemplary embodiment illustrated in FIG. 22 is merely an example. According to circumstances, the function corresponding to the rubbing gesture may not be applied to an area in which the bending line is changed, or the area may be divided according to an average of changed bending lines.

Figure 23:
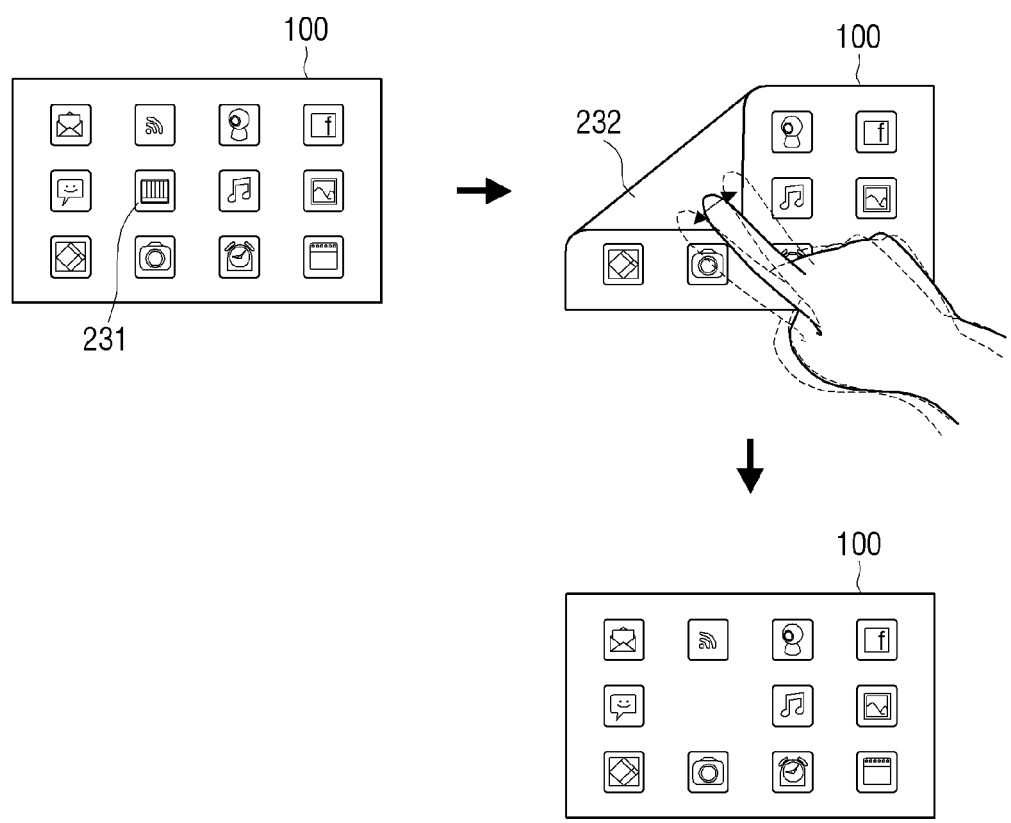
FIG. 23 is a view illustrating a function performed according to a rubbing gesture according to an exemplary embodiment.

FIG. 23 is a view illustrating a function performed according to a rubbing gesture according to an exemplary embodiment.

As shown in FIG. 23, it is assumed that a certain area of the flexible display apparatus 100 is bent and then a rubbing gesture is locally performed while a specific area 232 is being pressed.

In this case, only an object 231 which is located under the pressed area 232 may be deleted.

FIG. 24 is a view illustrating a function performed according to a rubbing gesture according to another exemplary embodiment.

As shown in views (a) and (b) of FIG. 24, a function of copying a content or pasting a content may be performed on an area where a rubbing gesture is locally performed.

Specifically, as shown in view (a) of FIG. 24, it is assumed that a trash bin icon 241 is displayed on a center area of the screen of the flexible display apparatus 100, a certain area is bent, and then a rubbing gesture is locally performed while an area 242 where the trash bin icon 241 is displayed is being pressed.

In this case, the trash bin icon 241 which is displayed under the pressed area 242, that is, displayed on the center area of the screen may disappear, and the trash bin icon 241 may be generated on a left upper corner area corresponding to the pressed area 242. That is, a content copy function may be performed according to the rubbing gesture.

Also, when the left upper corner area where the trash bin icon 241 is moved and displayed is bent toward the center area of the screen and a rubbing gesture is locally performed while the bent left upper corner area is being pressed as shown in view (b) of FIG. 24, the trash bin icon 241 may be moved to the center area of the screen and displayed. That is, a content pasting function may be performed according to the rubbing gesture.

Figure 25:
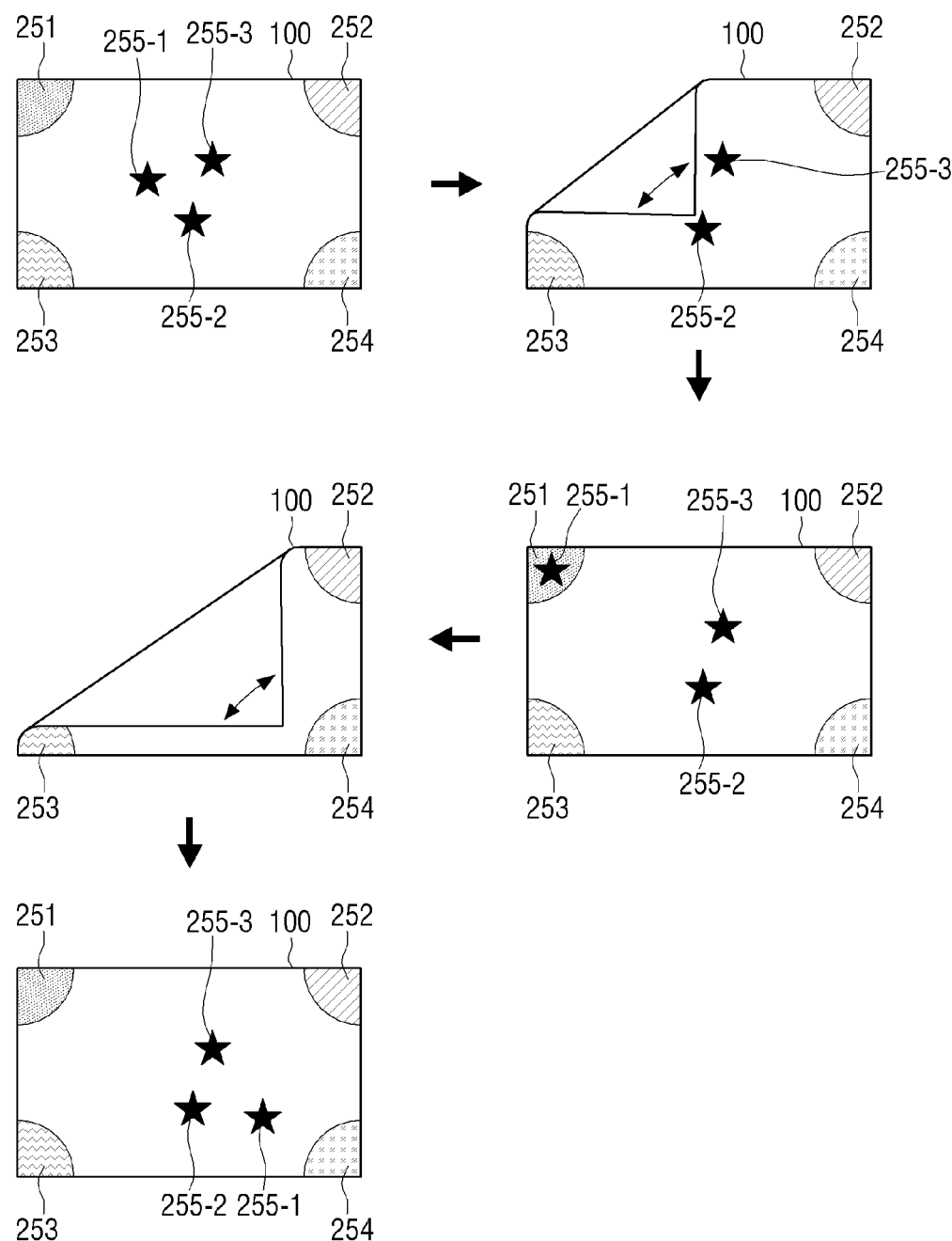

FIG. 25 is a view illustrating a function performed according to a rubbing gesture according to still another exemplary embodiment.

Referring to FIG. 25, four corner areas 251 to 254 of the screen of the flexible display apparatus 100 may be used as content copying or storage areas. That is, all of the areas of the screen do not perform a content copying or storing function, and only the four corner areas 251 to 254 may perform the content copying or storing function.

For example, when the left upper corner area 251 is bent and placed on a first object 255-1 from among objects 255-1 to 255-3 displayed on the center area of the screen, and then a rubbing gesture is locally performed, the first object 255-1 which is rubbed may be stored in the left upper corner area 251, and displayed.

Next, when the left upper corner area 251 in which the first object 255-1 is stored is re-bent and placed on an area where the objects are not displayed, and then a rubbing gesture is locally performed, the first object 255-1 which is stored in the left upper corner area 251 may be moved to the area which is rubbed, and may be displayed.

Also, although not shown, when the left upper corner area 251 in which the first object 255-1 is stored is re-bent and placed on the area where the second object 255-2 is displayed, and then a rubbing gesture is locally performed, the second object 255-2 which is displayed on the rubbed area disappears and the first object 255-1 which is stored in the left upper corner area 251 is moved to the rubbed area and displayed.

Figure 26:
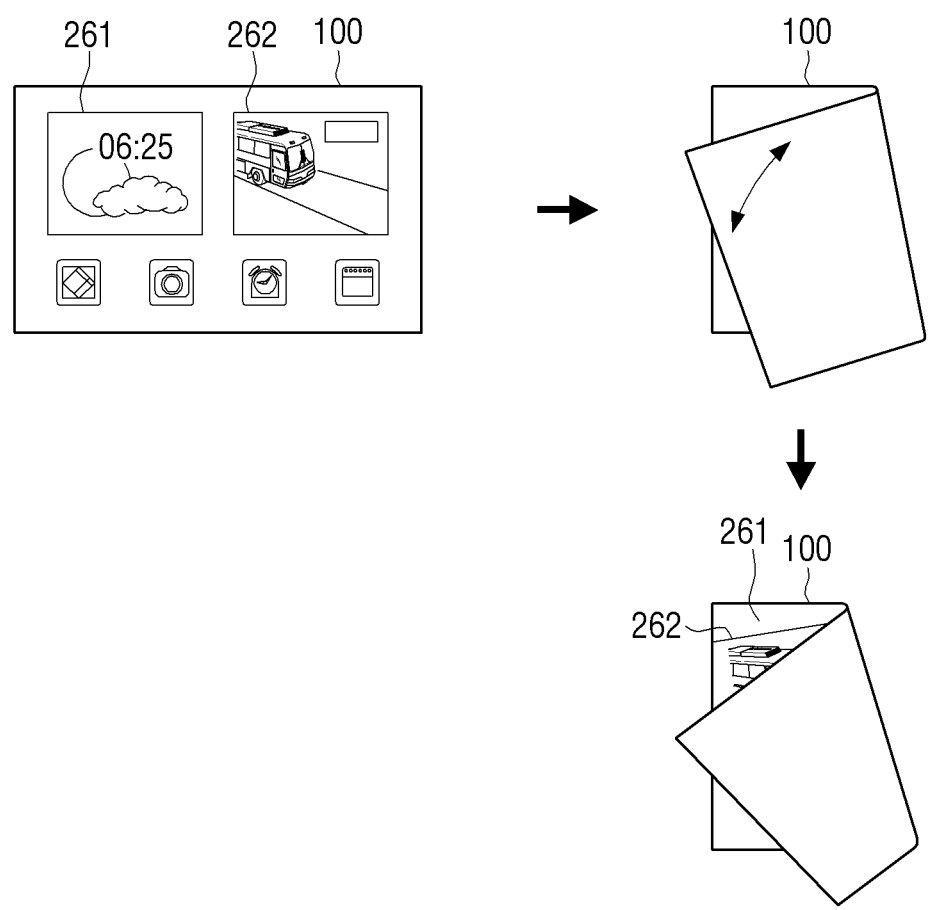

FIG. 26 is a view illustrating a function performed according to a rubbing gesture according to still another exemplary embodiment.

As shown in FIG. 26, when a plurality of application execution screens 261 and 262 are displayed on the screen of the flexible apparatus 100, a whole rubbing gesture is performed while the screen is folded in half, and the folded area is unevenly unfolded, application screens 261-1 and 262-1 which are currently executed may be displayed in sequence.

On the other hand, although not shown, when an execution screen is not displayed and an application which is being executed (for example, a music player) exists on a desktop, a corresponding application screen may be displayed according to a whole rubbing gesture.

Figure 27:
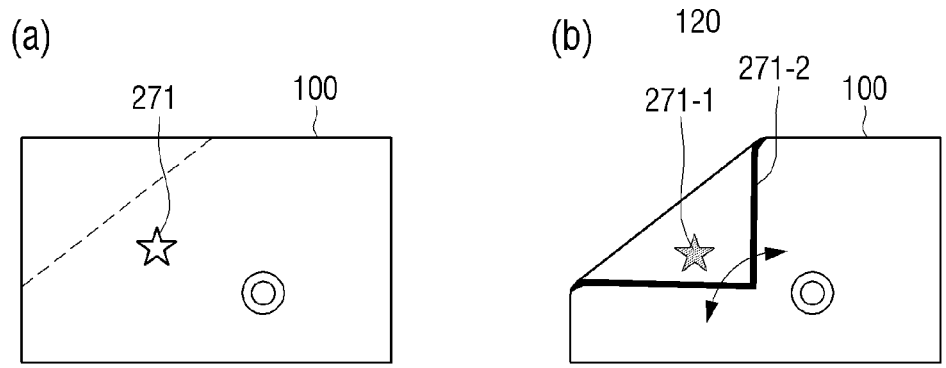

FIG. 27 is a view illustrating a method for providing a feedback effect according to an exemplary embodiment.

When a rubbing gesture is performed on an object 271 displayed on the screen of the flexible display apparatus 100 as shown in view (a) of FIG. 27, a graphic feedback effect 271-1 is provided to the object 271 to be rubbed or around the object 271 as shown in view (b) of FIG. 27, so that the user can recognize the object to be rubbed. Also, a visual effect 271-2 may be provided around the bent area 271-2.

Also, although not shown, vibration feedback is provided to the object 271 to be rubbed or around the object 271, so that the user can recognize the object to be rubbed.

In this case, the flexible display apparatus 100 may determine an object which is located in an area where screens are in contact with each other or overlap each other when the flexible display apparatus 100 is bent or folded, as an object to be rubbed.

Figure 28:
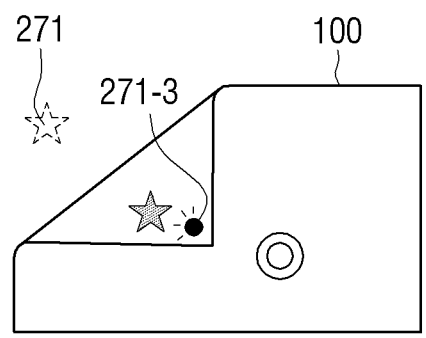

FIG. 28 is a view illustrating a method for providing a feedback effect according to another exemplary embodiment.

As shown in FIG. 28, the flexible display apparatus 100 may inform the user that the flexible display apparatus 100 is in a ready state in which a rubbing gesture is possible in a corresponding area, using an LED 271-3 provided in the rear surface of the display screen. For example, when the flexible display apparatus 100 is bent by more than a predetermined angle, a bending line is formed where a specific object 271 can be indicated, and a bent area is in contact with the specific object 271, it is determined that the flexible display apparatus 100 is in the ready state.

FIGS. 29 to 34 are views illustrating functions performed according to a rubbing gesture according to still another exemplary embodiment.

FIGS. 29 to 34 are views to illustrate a function corresponding to a rubbing gesture when the flexible display apparatus 100 performs an e-book function. The function of the flexible display apparatus 100 is limited to the e-book function in FIGS. 29 to 34. However, this is for the convenience of explanation, and any function to which the illustrated exemplary embodiments can be applied, such as a web page display function and a diary providing function, can be applied without limitation.

Figure 29:
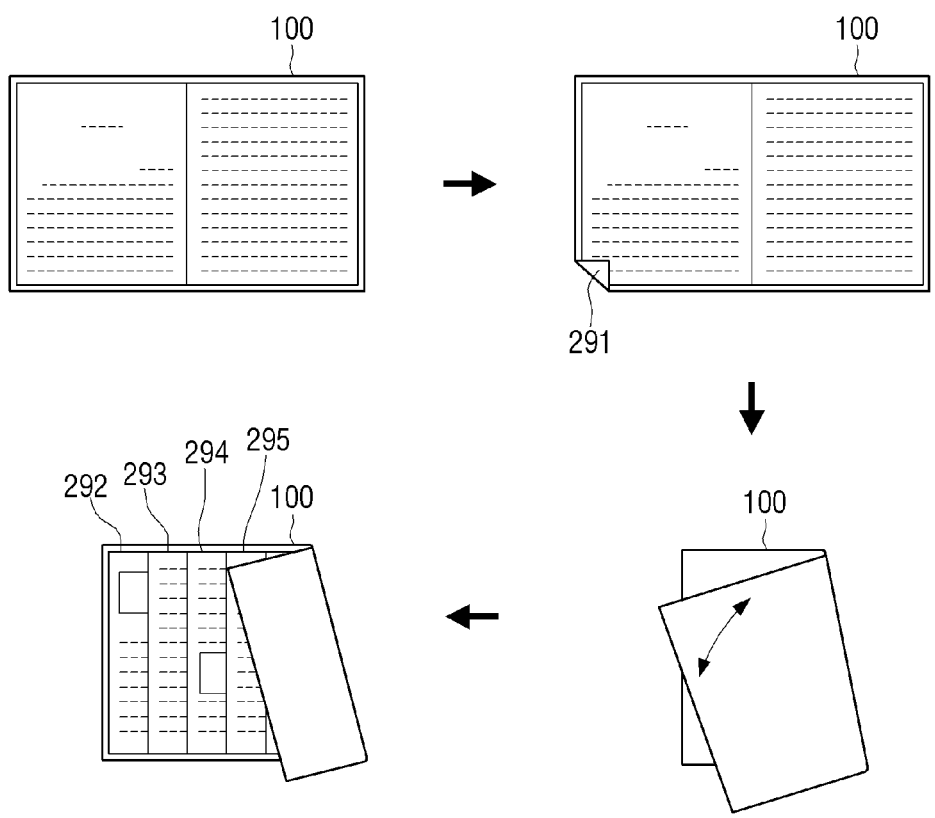

When the flexible display apparatus 100 performs an e-book function as shown in FIG. 29, a bookmarking function may be performed by bending a corner area 291.

Next, when a whole rubbing gesture is performed while the screen is folded in half, only the pages 292 to 295 marked with bookmarks are displayed in sequence.

Figure 30:
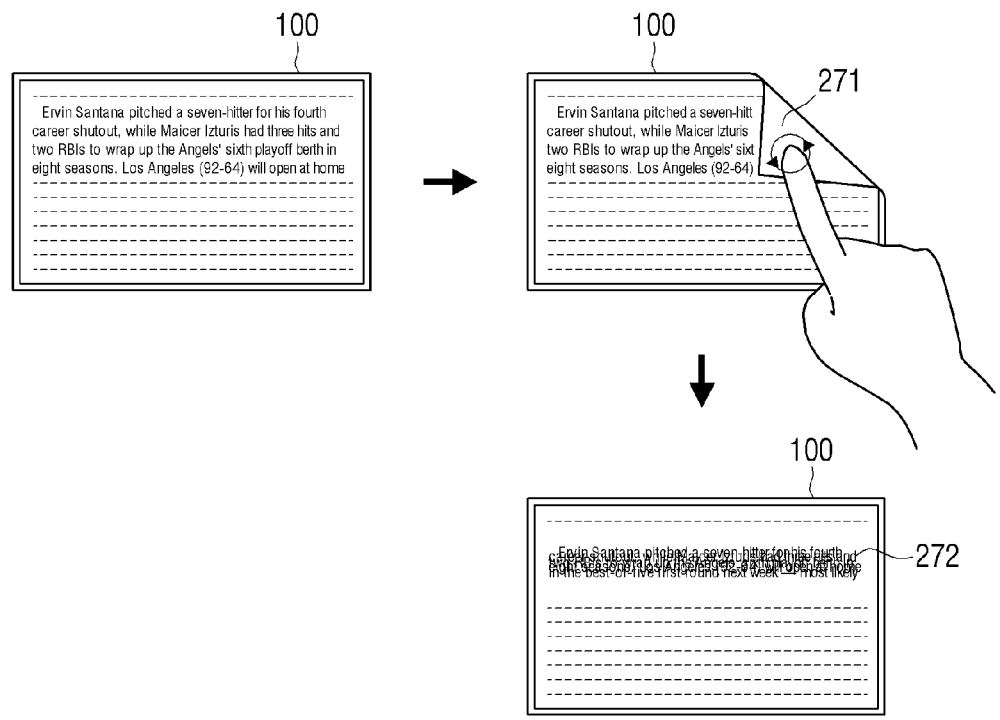

When the flexible display apparatus 100 performs the e-book function, and when one corner area 301 of the screen is bent and is brought into contact with some text areas on the screen, and then a rubbing gesture is performed as shown in FIG. 30, a gap between the texts displayed on the corresponding area may be reduced and may be displayed (272). The rubbing gesture may be an operation of rubbing in a circular form, and a degree of reduction in the gap may vary according to a number of times that the circle is drawn or a magnitude of applied pressure.

Also, according to circumstances, the texts displayed on the corresponding area may be compressed and stored based on the number of times that the circle is drawn or the magnitude of applied pressure. In the above-described exemplary embodiment, the texts are illustrated, but an image may be compressed and stored.

Figure 31:
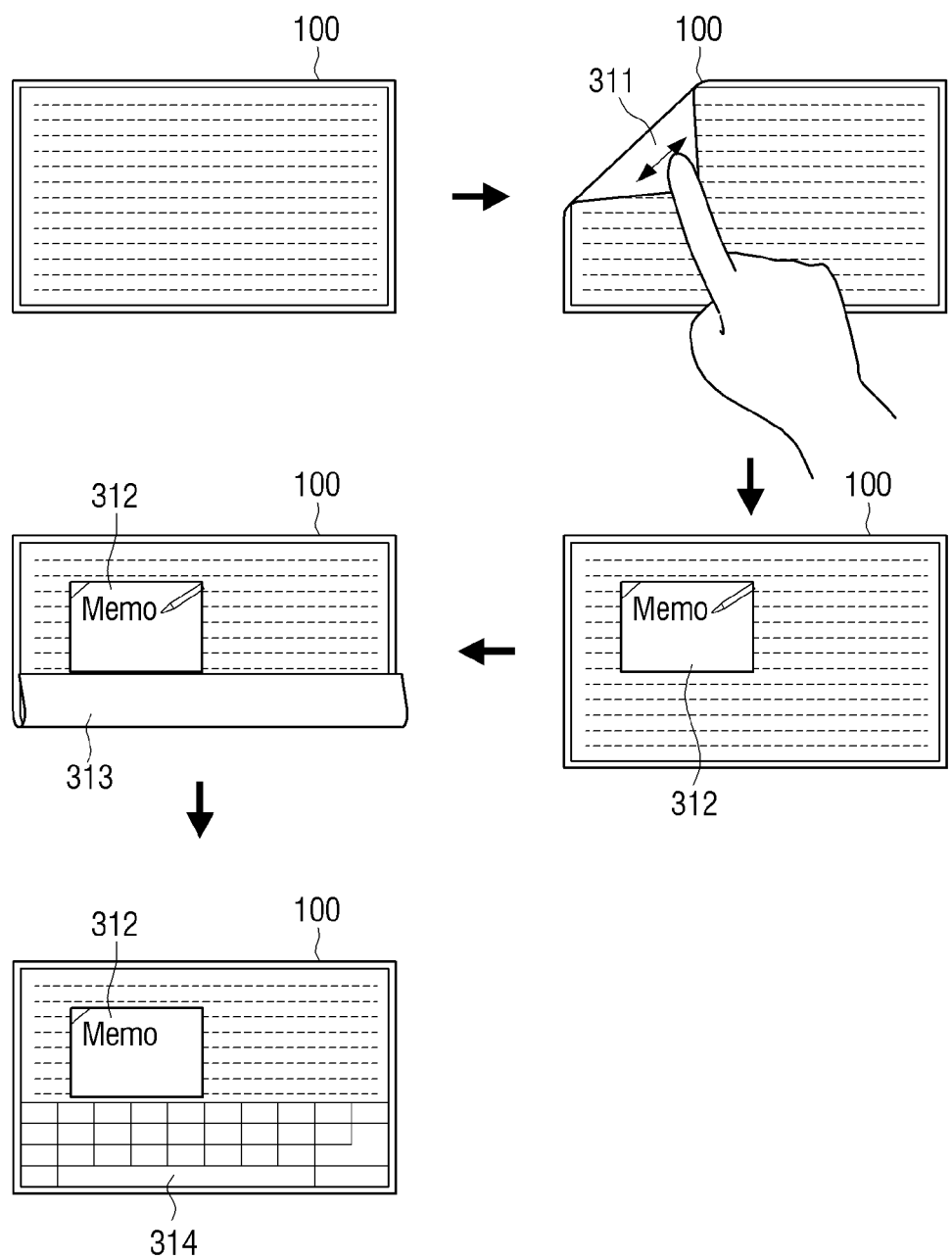

When one corner area 311 of the screen is bent and is brought into contact with some areas of the screen, and then a rubbing gesture is performed as shown in FIG. 31, an insert area may be displayed on the corresponding area. For example, a memo pad 312 may be displayed on the area where the rubbing gesture is performed as shown in FIG. 31. The memo pad 312 may be displayed in the form of a pop-up window.

On the other hand, when a lower area 313 of the flexible display apparatus 100 is bent while the memo pad 312 is displayed, a keyboard screen 314 may be displayed on the bent area to write on the memo pad 312.

Figure 32:
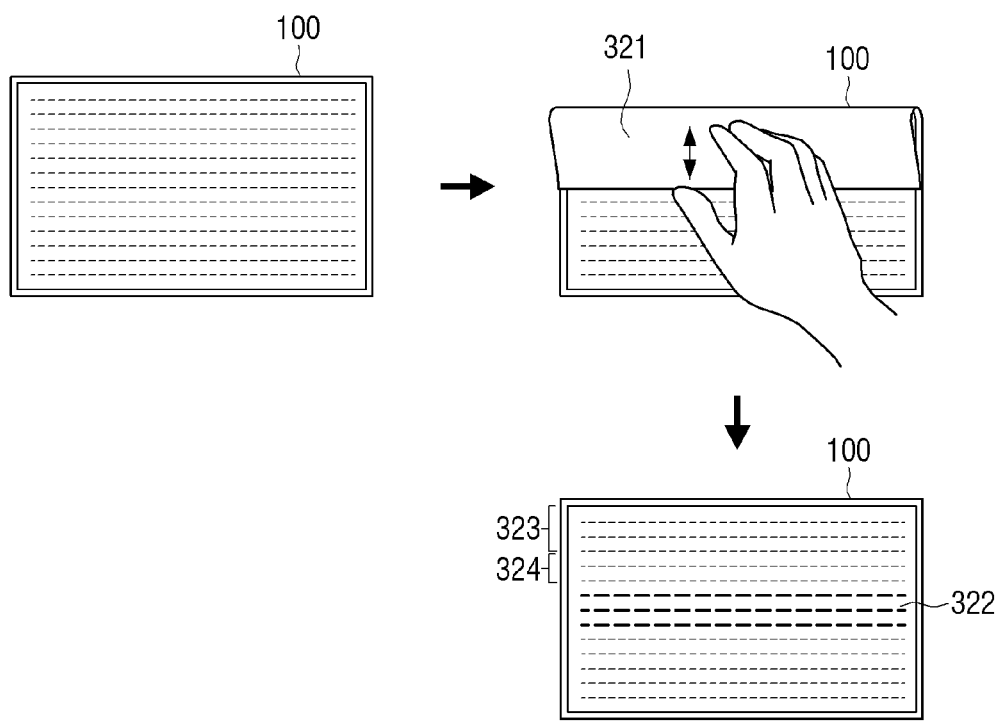

When an area 312 including one side of the screen is bent and is brought into contact with some areas of the screen, and then a rubbing gesture is performed as shown in FIG. 32, texts that are displayed on the area where the rubbing gesture is performed, that is, the area brought into contact with the other area, may be highlighted. For example, the texts that are displayed on the area where the rubbing gesture is performed may be displayed in bold type as shown in FIG. 32. In this case, the texts that are displayed on an area 323 that has its location moved by the bending, and are displayed on an area 324 where a bending line is formed may not be highlighted.

Figure 33:
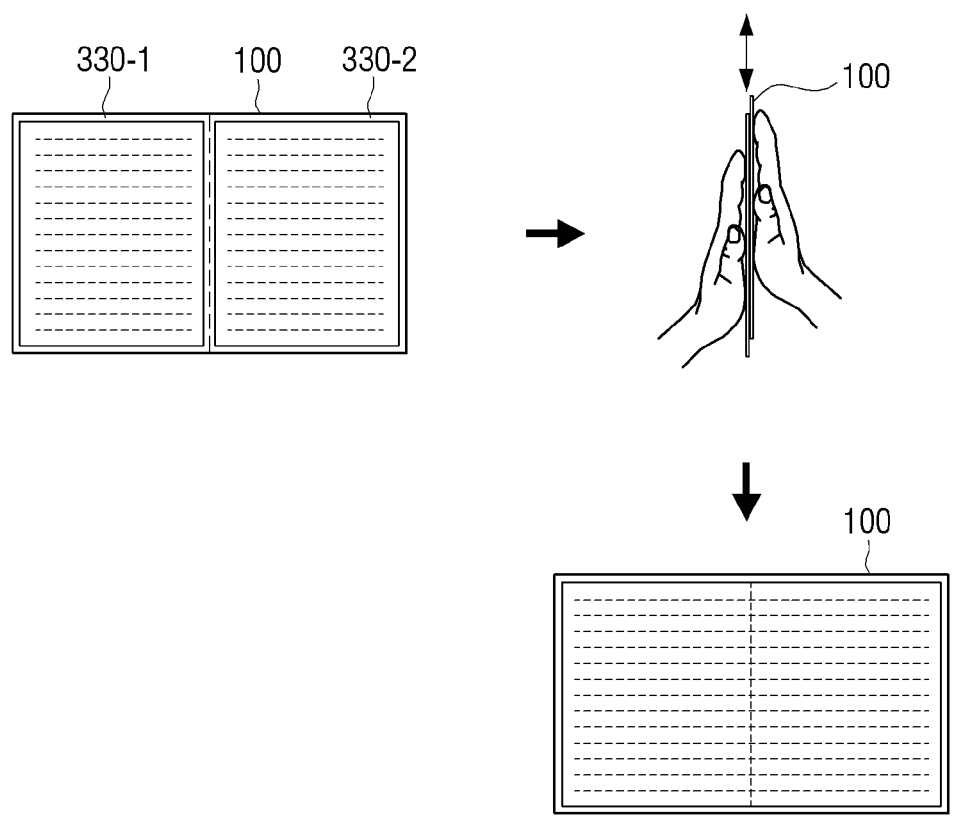

As shown in FIG. 33, the flexible display apparatus 100 may include a dual screen. That is, the flexible display apparatus 100 may include two electronic paper displays (EPDs) 330-1 and 330-2.

The EPDs 330-1 and 330-2 may display continuous pages of an e-book. That is, an nth page is displayed on the EPD-1 330-1 and an n+1th page is displayed on the EPD-2 330-2. Accordingly, the dual screen e-book terminal may provide the e-book in the same method as a real book.

When the two EPDs 330-1 and 330-2 provided in the flexible display apparatus 100 are folded facing each other and then a whole rubbing gesture is performed as shown in FIG. 33, the screens displayed on the two EPDs 330-1 and 330-2 may be integrated into a single screen and the single screen may be displayed. For example, the nth page may be displayed on an upper portion and the n+1th page may be displayed on a lower portion.

However, this is merely an example. Various integrating functions, such as making a boundary line disappear and integrating separate contents into a single content, may be performed according to the rubbing gesture.

Figure 34:
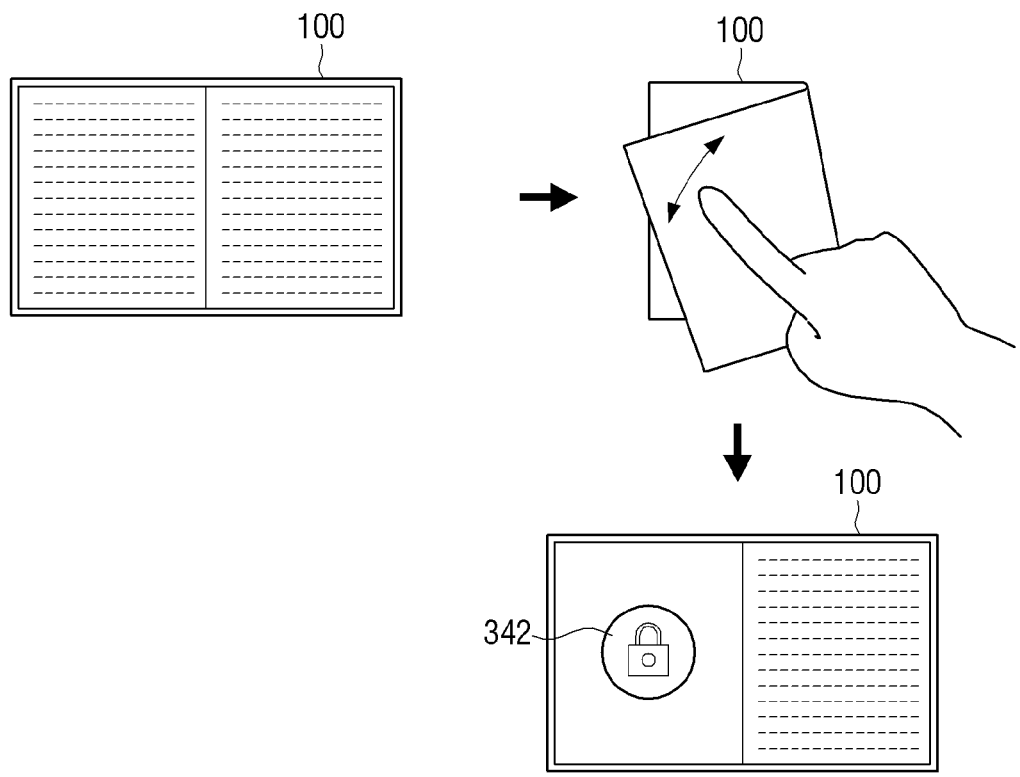

When the flexible display apparatus 100 is folded in half and then a whole rubbing gesture is performed as shown in FIG. 34, a function of storing a rubbed page may be provided. In this case, a lock display icon 342 indicating that the corresponding page is separately stored and is not visible may be displayed on the screen. Accordingly, the user may store a desired page or a part though the separate lock function, so that the other persons cannot view the page. This is applied to a memo pad or a diary function.

Figure 35:
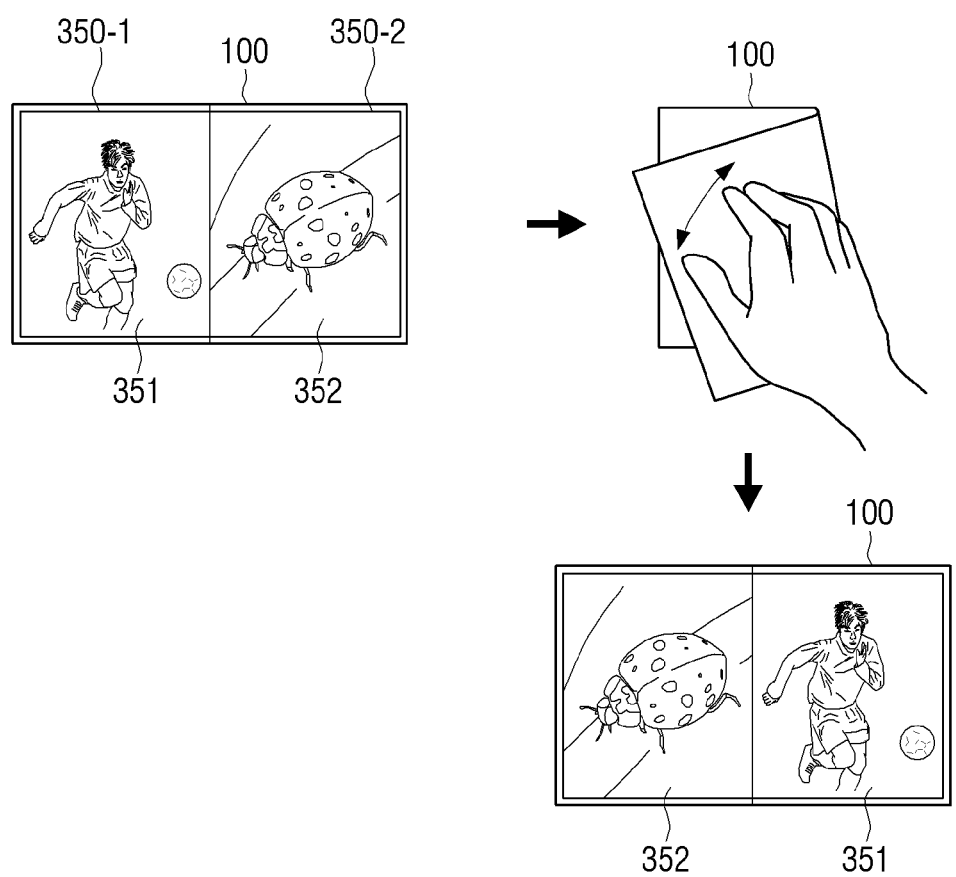

FIG. 35 is a view illustrating a function performed according to a rubbing gesture according to still another exemplary embodiment.

As shown in FIG. 35, it is assumed that the flexible display apparatus 100 is implemented by using a dual display apparatus including two screens 350-1 and 350-2, and a first image 351 is displayed on the first screen 350-1 and a second image 352 is displayed on the second screen 350-2.

When the first and second screens 350-1 and 350-2 provided in the flexible display apparatus 100 are folded facing each other and then a whole rubbing gesture is performed, the locations of the first image 351 and the second image 352, which are displayed on the first and second screens 350-1 and 350-2, respectively, are interchanged with each other. For example, the first image 351 which has been displayed on the first screen 350-1 is displayed on the second screen 350-2, and the second image 352 which has been displayed on the second screen 350-2 is displayed on the first screen 350-1, as shown in FIG. 35.

FIG. 36 is a view illustrating a function performed according to a rubbing gesture according to still another exemplary embodiment.

As shown in view (a) of FIG. 36, it is assumed that a first content 361 is displayed on a first flexible display apparatus 100-1 and a second content 362 is displayed on a second flexible display apparatus 100-2.

When the second flexible display apparatus 100-2 is placed over the first flexible display apparatus 100-1 such that a screen of the second flexible display apparatus 100-2 faces a screen of the first display apparatus 100-1, and then a rubbing gesture is performed, the content 361 which has been displayed on the screen of the first flexible display apparatus 100-1 is copied into the screen of the second flexible display apparatus 100-2, and may be displayed (363). That is, the content may be transmitted between apparatuses by the rubbing gesture.

In view (a) of FIG. 36, the content 361 displayed on the screen of the first flexible display apparatus 100-1 is transmitted to the second flexible display apparatus 100-2 by the rubbing gesture. However, this is merely an example. The content 362 displayed on the second flexible display apparatus 100-2 may be transmitted to the first flexible display apparatus 100-1 according to the rubbing gesture, or the contents may be transmitted between the flexible display apparatuses 100-1 and 100-2 simultaneously.

As shown in view (b) of FIG. 36, it is assumed that a third content 363 is displayed on the first flexible display apparatus 100-1.

When the first flexible display apparatus 100-1 and the second flexible display apparatus 100-2 are placed overlapping each other, corresponding locations, for example, left upper corner areas are bent, and then a rubbing gesture is performed, the third content 363 displayed on the left upper corner area of the first flexible display apparatus 100-1 may be copied into the left upper corner area of the second flexible display apparatus 100-2 and may be displayed (363').

Figure 37:
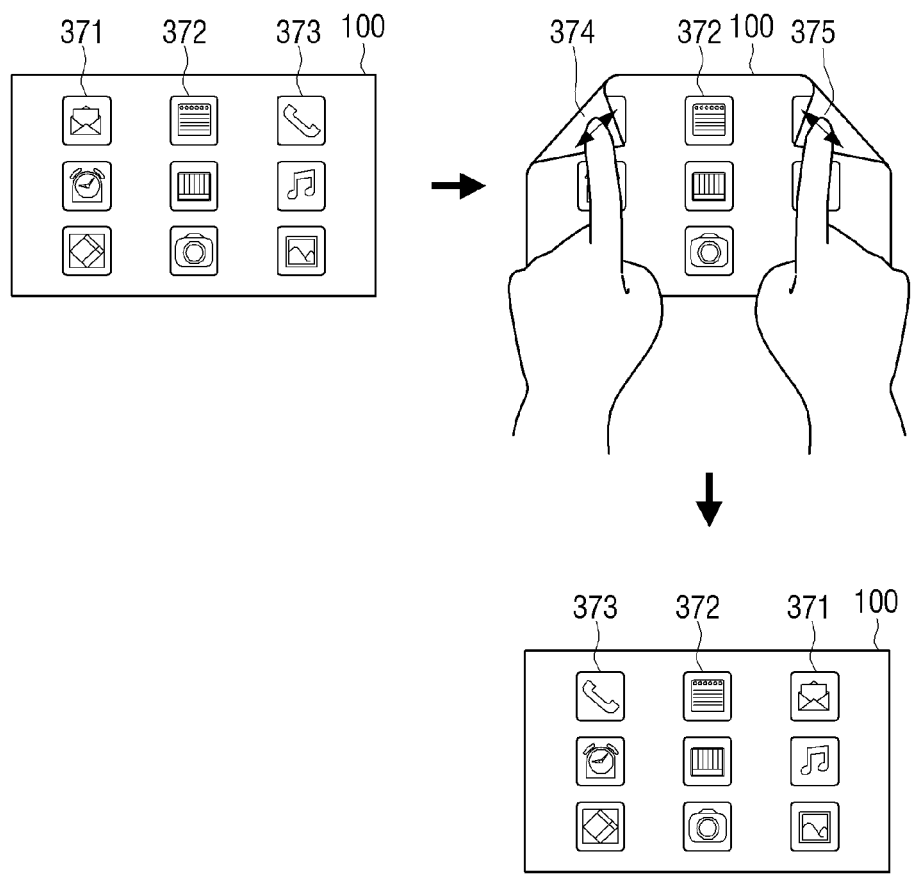

FIG. 37 is a view illustrating a function performed according to a rubbing gesture according to still another exemplary embodiment.

As shown in FIG. 37, when two different areas of the flexible display apparatus 100 are simultaneously bent and a rubbing gesture is performed on each of the two areas, locations of contents displayed on the two areas may be interchanged with each other and displayed.

For example, when first, second, and third contents 371, 372, and 373 are displayed on the flexible display apparatus 100, a left upper corner area 374 and a right upper corner area 375 are simultaneously bent, and a rubbing gesture is performed on each of the left and right upper corner areas 374 and 375 as shown in FIG. 37, the first and third contents 371 and 373 which are displayed on the left upper corner area 374 and the right upper corner area 375, respectively, are interchanged with each other and displayed.

Figure 38:
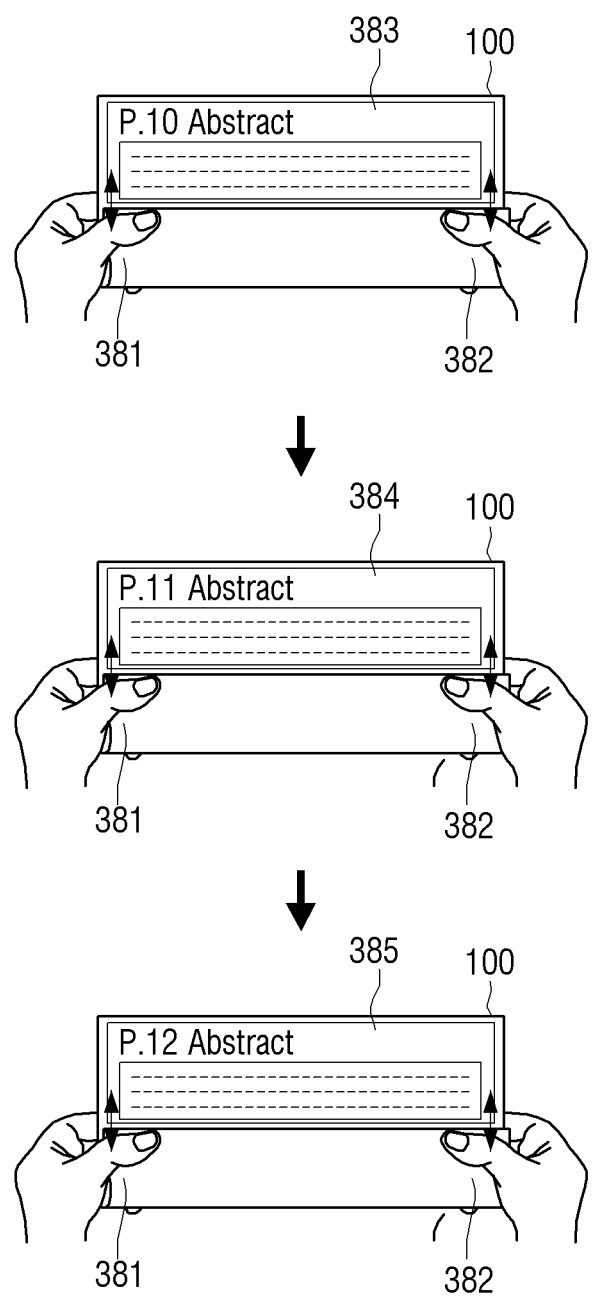

FIG. 38 is a view illustrating a function performed according to a rubbing gesture according to still another exemplary embodiment.

As shown in FIG. 38, when the flexible display apparatus 100 performs an e-book function, and when the user bends one area of the flexible display apparatus 100, grips the flexible display apparatus 100 with both hands, and makes a rubbing gesture, an abstract of each page may be displayed on an area where the bending does not occur in sequence. Also, pages marked with bookmarks may be displayed in sequence or only pages with a memo may be displayed in sequence according to the rubbing gesture.

Figure 39:
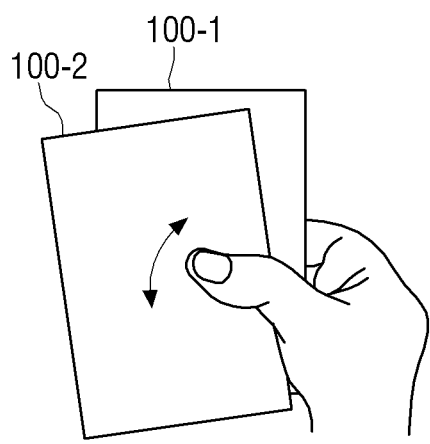
FIG. 39 is a view illustrating a function performed according to a rubbing gesture according to still another exemplary embodiment.

FIG. 39 is a view illustrating a function performed according to a rubbing gesture according to still another exemplary embodiment.

As shown in FIG. 39, flexible display apparatuses 100-1 and 100-2 according to still another exemplary embodiment may be implemented to have an area smaller than a predetermined area. For example, the flexible display apparatuses 100-1 and 100-2 may be implemented to have a size of a name card.

In this case, a specific function may be performed through a user manipulation of overlapping the two flexible display apparatuses 100-1 and 100-2 and rubbing the overlapped flexible display apparatuses 100-1 and 100-2 together as shown in FIG. 39. For example, a content stored in the first flexible display apparatus 100-1 may be copied into the second flexible display apparatus 100-2 through the rubbing manipulation. In this case, the content displayed on the screen of the first flexible display apparatus 100-1 may be copied into the second flexible display apparatus 100-2 and may be displayed on the screen of the second flexible display apparatus 10-2 when the rubbing manipulation is performed. In this case, since the present exemplary embodiment can be applied when the apparatus does not have flexibility, the present exemplary embodiment can be extended to a display apparatus without flexibility.

FIG. 40 is a view illustrating a configuration of a flexible apparatus interlocked with an external display apparatus according to still another exemplary embodiment.

Referring to view (a) of FIG. 40, the flexible apparatus 100 is connected to the display apparatus 200 in a wired manner or wireless manner. As described above, the flexible apparatus 100 is made of flexible material and can be bent by the user, whereas the display apparatus 200 is a general display apparatus which is not flexible. Specifically, the display apparatus 200 may be implemented by using various kinds of display apparatuses, such as a TV, an electronic album, a monitor, and an advertising board. In this case, the flexible apparatus 100 may exclude a configuration for supporting the display function from the configuration of the display 110 shown in FIG. 2, and may include only a flexible substrate.

In an example, the flexible apparatus 100 may be operated as a remote control apparatus to control the display apparatus 200. The flexible apparatus 100 may receive a user command to control the display apparatus 200, and may transmit a control signal corresponding to the input user command to the display apparatus 200.

In particular, the flexible apparatus 100 senses a rubbing gesture and transmits a signal corresponding to the sensed rubbing gesture to the display apparatus 200. In this case, the flexible apparatus 100 may transmit the signal corresponding to the sensed rubbing gesture (hereinafter, referred to as a control signal), but may convert the signal corresponding to the sensed rubbing gesture into a control command signal to control the display apparatus 200 (hereinafter, referred to as control information), and may transmit the control command signal. Such a different process may be performed according to whether an operation for calculating the control information based on the sensed signal is performed in the flexible apparatus 100 or the display apparatus 200.

The flexible apparatus 100 and the display apparatus 200 may communicate with each other in various communication methods such as Bluetooth, IR interface, Wi-Fi, PAN, LAN, WAN, wired I/O, universal serial bus (USB). For example, when the flexible apparatus 100 and the display apparatus 200 communicate with each other through Bluetooth, they may be interlocked with each other through Bluetooth pairing. The Bluetooth pairing is well known to an ordinary skilled person in the related art and thus a detailed description thereof is omitted.

When the display apparatus 200 receives a control signal corresponding to a bending manipulation from the flexible apparatus 100, the display apparatus 200 performs a control operation according to the control signal. The control signal may be configured for and transmitted by using an infrared ray (IR) signal, and may be a communication signal which is transmitted through various interfaces such as Bluetooth, NFC, Wi-Fi, Zigbee, and serial interface. In this case, the flexible apparatus 100 may exclude the display 110 as shown in view (b) of FIG. 40, and may include the sensor 120, the controller 130, and the storage 140, and may further include a communicator 150 to communicate with the display apparatus 200.

The storage 140 may store various commands corresponding to bending manipulations. When a bending manipulation is sensed by the sensor 110, the controller 120 detects a command corresponding to the sensed bending manipulation from the storage 140, generates a control signal corresponding to the command, and transmits the control signal to the display apparatus 200 through the communicator 150. The command stored in the storage 140 may be a command that is assigned according to a bending manipulation supported by the display apparatus 200 and is stored in advance. In particular, the storage 140 may store a command corresponding to a rubbing gesture.

Accordingly, when a bending manipulation is sensed by the sensor 120, the controller 130 may transmit a control signal to instruct the display apparatus 200 to perform a control operation corresponding to the sensed bending manipulation to the display apparatus 200. Accordingly, the user may control the operation of the external display apparatus 200 by bending the flexible apparatus 100.

For example, when it is determined that a rubbing gesture of rubbing a plurality of different areas of the flexible apparatus 100 based on a bending manipulation is performed, the flexible apparatus 100 may transmit a control signal to perform a corresponding function to the display apparatus 200.

However, as described above, the flexible apparatus 100 may only transmit a sensing signal to the display apparatus 200 and the display apparatus 200 may generate a control signal corresponding to the sensing signal.

Figure 41:
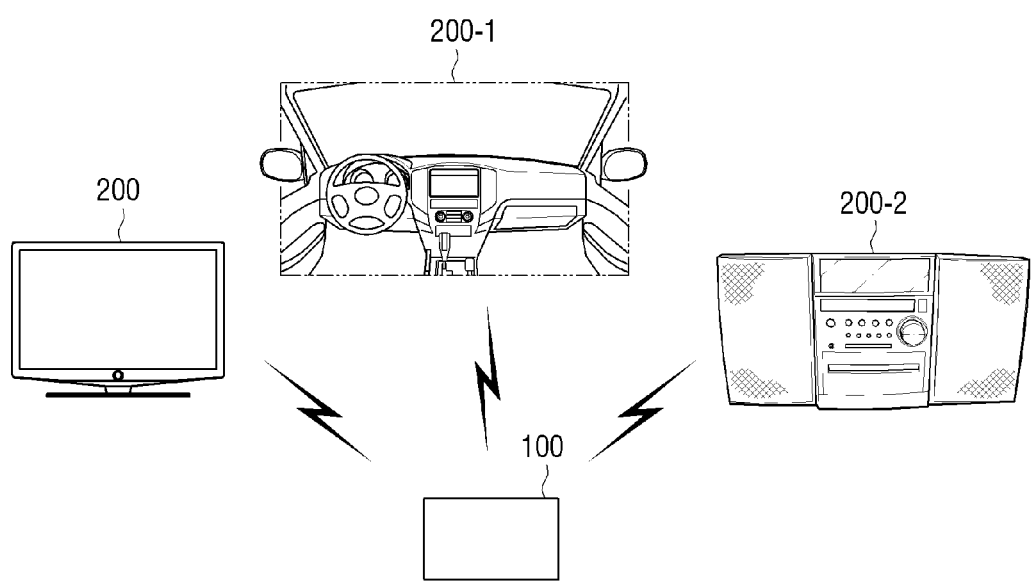
FIG. 41 is a view illustrating a configuration of a flexible apparatus interlocked with an external display apparatus according to still another exemplary embodiment.

FIG. 41 is a view illustrating a configuration of a flexible apparatus interlocked with an external display apparatus according to still another exemplary embodiment.

As shown in FIG. 41, the flexible apparatus 100 may be implemented by using an integrated remote control apparatus which is able to control a plurality of external apparatuses.

For example, as shown in FIG. 41, the flexible apparatus 100 may be implemented in the form of controlling a plurality of external apparatuses, such as a car 200-1 and an audio system 200-2 in addition to a display apparatus 200. Since the same principle as that of a related-art integrated remote control apparatus may be applied when the function of controlling the plurality of apparatuses is performed, a detailed description is omitted.

FIG. 42 is a view illustrating a method for operating the flexible apparatus shown in FIG. 40.

When a rubbing gesture on the flexible apparatus 100 is sensed as shown in FIG. 41, various functions of the display apparatus 200 may be controlled. For example, when the rubbing gesture is sensed in the flexible apparatus 100 once, the display apparatus 200 may perform various functions, such as changing a channel, adjusting a volume, adjusting brightness, turning a display page, and exchanging a file. When a series of gestures of continuously moving a bending line formed by a bending manipulation and then returning to its original point is sensed, it is determined that the rubbing gesture is sensed.

In this case, a function corresponding to a kind of a content that is displayed on the display apparatus 200 at the time of the rubbing gesture may be performed. For example, when the rubbing gesture is sensed in the flexible apparatus 100 while an Internet function is executed in the display apparatus 200 and a web page is displayed, a function of turning a page may be performed.

Also, when a bending shape is held for more than a predetermined time at a time when a single rubbing gesture finishes in the flexible apparatus 100, the display apparatus 200 may repeat a mapped function or may perform a function fast. For example, the display apparatus 200 may change a channel fast, adjust a volume fast, or change a page fast.

When a single rubbing gesture is sensed in the flexible apparatus 100, at least one of audio feedback and haptic feedback may be provided at a time when a bending line is formed and at a time when the bending line is moved and finishes. Accordingly, the user may recognize whether the single rubbing gesture is completely received by the flexible apparatus 100.

As shown in view (a) of FIG. 42, when a rubbing gesture is sensed in the flexible apparatus 100, the display apparatus 100 may perform a channel change function.

As shown in view (a) of FIG. 42, when a specific channel is selected and is broadcasted in the display apparatus 200, and a rubbing gesture is sensed in the flexible apparatus 100, the flexible apparatus 100 may transmit a corresponding control signal to the display apparatus 200. In this case, the display apparatus 200 may change a current channel to a next channel or a previous channel according to the received control signal. The channel may be changed to the next channel or previous channel according to a bending start point, a z direction of a bending line, and etc. Also, when a bending state is held after a single bending manipulation is performed, the channel may be continuously changed.

As shown in view (b) of FIG. 42, when a UI screen is displayed on the display apparatus 200 and a rubbing gesture is sensed in the flexible apparatus 100, the display apparatus 200 may change the UI screen to another UI screen and display the new UI screen. For example, a currently displayed UI page may be changed to a next UI page as shown in view (b) of FIG. 42.

Figure 43:
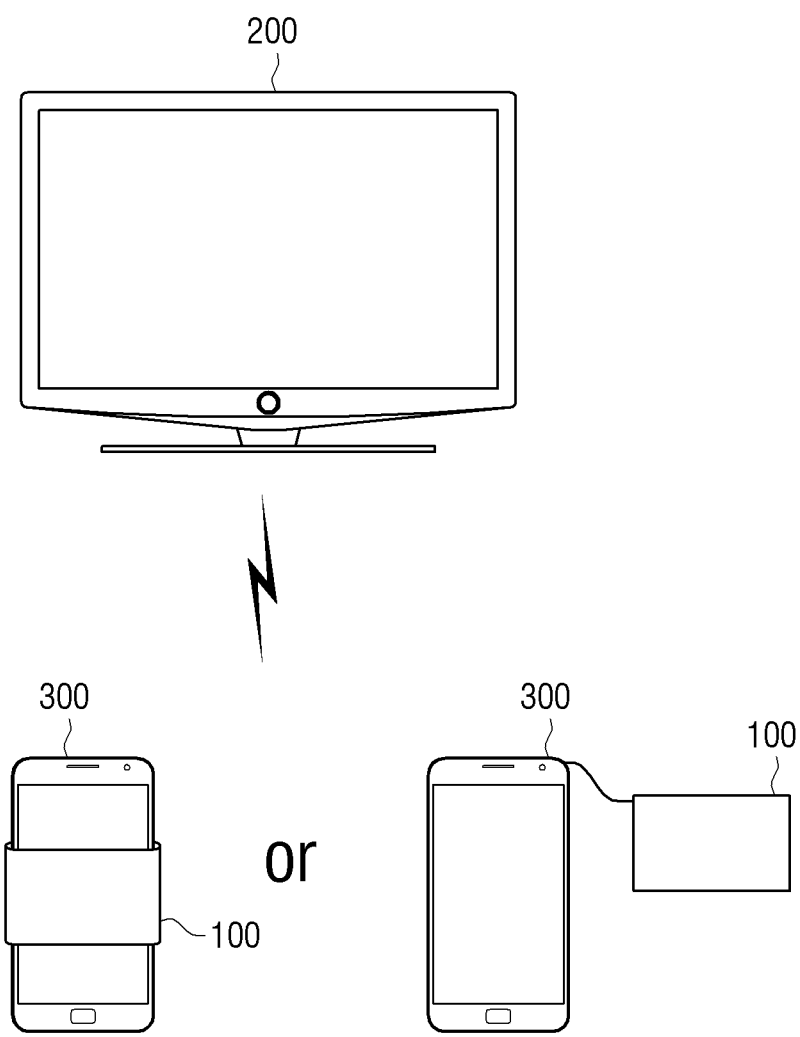
FIG. 43 is a view illustrating a method for operating a flexible apparatus according to still another exemplary embodiment.

FIG. 43 is a view illustrating a method for operating a flexible apparatus according to still another exemplary embodiment.

As shown in FIG. 43, the flexible apparatus 100 may be implemented in the form of being connected to an external apparatus 300 such as a smartphone and controlling another external display apparatus 200. For example, the flexible apparatus 100 may include a CPU of lower performance and have only a low computing function, or may have only an ability to communicate with an external apparatus. In this case, the flexible apparatus 100 may be operated as a remote control apparatus to control the external display apparatus 200 using a computing function of the external apparatus 300 such as a high performance smartphone. In this case, the flexible apparatus 100 may be connected to the external apparatus 300 through an interface.

Although not shown in the drawing, the flexible apparatus 100 may be connected to the external apparatus 300 to be used as an input tool for the external apparatus 300, rather than being connected to the external apparatus 300 to control the external display apparatus 200.

FIGS. 44 and 45 are views illustrating an example of a flexible display apparatus according to various exemplary embodiments.

View (a) of FIG. 44 is a view illustrating an example of a flexible display apparatus which is embedded in a body according to an exemplary embodiment.

Referring to view (a) of FIG. 44, the flexible display apparatus 100 includes a body 430, a display 110, and a grip part 431.

The body 430 may serve as a kind of a case containing the flexible display apparatus 100. When the flexible display apparatus 100 includes various elements as shown in FIG. 17, elements other than the display 110 and some sensors may be mounted in the body 430. The body 430 includes a rotary roller for rolling the display 110. Accordingly, when not in use, the display 110 is rolled about the rotary roller and embedded in the body 430.

When the user holds the grip part 431 and pulls the display 110, the rotary roller is rotated in the opposite direction to that of the rolling and rolling is released, so that the display 110 comes out to the outside of the body 430. A stopper may be provided on the rotary roller. Accordingly, when the user pulls the grip part 431 by more than a predetermined distance, the rotation of the rotary roller is stopped by the stopper and the display 110 may be fixed. Accordingly, the user can execute various functions using the display 110 that is outside of the body 431. When the user presses a button to release the stopper, the stopper is released and the rotary roller is rotated in a reverse direction. As a result, the display 110 is rolled in the body 430. The stopper may have a switch shape to stop an operation of a gear to rotate the rotary roller. Since the rotary roller and the stopper may employ a general rolling structure as it is, detailed illustration and explanation thereof are omitted.

The body 430 includes a power supply 500. The power supply 500 may be implemented using a battery connector on which a disposable battery is mounted, a secondary cell which can be charged and used multiple times by the user, and a solar cell which generates electricity using solar heat. When the power supply is implemented using the secondary cell, the user may connect the body 430 to an external power source through a wire and may charge the power supply 500.

In view (a) of FIG. 44, the body 430 has a cylindrical shape. However, the shape of the body 430 may be quadrangular or other polygonal shape. Also, the display 110 may be implemented in various forms such as enclosing the body 430, rather than being embedded in the body 430 and being exposed to the outside by being pulled.

View (b) of FIG. 44 is a view illustrating a flexible display apparatus in which a power supply 500 is attachable and detachable. Referring to view (b) FIG. 44, the power supply 500 is provided on one edge of the flexible display apparatus and is attachable and detachable.

The power supply 500 is made of a flexible material and can be bent along with the display 110. Specifically, the power supply 500 includes a cathode collector, a cathode electrode, an electrolyte, an anode electrode, an anode collector, and a sheath covering the aforementioned members.

For example, the collector may be implemented by using an alloy such as TiNi having good elasticity, metal such as copper and aluminum, etc., a conductive material such as metal coated with carbon, carbon, and a carbon fiber, or a conducting polymer, etc. such as polypyrole.

The cathode electrode may be manufactured by a negative electrode material such as metal such as lithium, natrium, zinc, magnesium, cadmium, hydrogen storage alloy, and lead, etc., nonmetal such as carbon, and a high polymer electrode material such as organosulfur.

The anode electrode may be manufactured by a positive electrode material such as sulfur and metal sulfide, lithium transition metal oxide such as $LiCoO_2$, and a polymer electrode material such as $SOCl_2$, $MnO_2$, $Ag_2O$, $Cl_2$, $NiCl_2$, and $NiOOH$ etc. The electrolyte may be implemented in a gel form using PEO, PVdF, PMMA, and PVAC.

The sheath may use a general polymer resin. For example, PVC, HDPE, or epoxy, etc. may be used. Besides these, any material that can prevent damage of a thread-type cell and is freely flexible or bendable may be used for the sheath.

Each of the anode electrode and the cathode electrode in the power supply 500 may include a connector to be electrically connected to an external source.

Referring to view (b) of FIG. 44, the connector protrudes from the power supply 500 and a recess corresponding to a location, a size, and a shape of the connector is formed on the display 110. Accordingly, the power supply 500 is connected with the display 110 as the connector and the recess are connected to each other. The connector of the power supply 500 is connected to a power connection pad (not shown) of the flexible display apparatus 100 to supply power to the flexible display apparatus 100.

Although the power supply 500 is attached to or detached from one edge of the flexible display apparatus 100 in view (b) of FIG. 44, this is merely an example. A location and a shape of the power supply 500 may be changed according to a product characteristic. For example, when the flexible display apparatus 100 has a predetermined thickness, the power supply 500 may be mounted on a rear surface of the flexible display apparatus 100.

FIG. 45 is a view illustrating an example of a flexible display apparatus according to various exemplary embodiments.

As shown in views (a) and (b) of FIG. 45, a flexible display apparatus 100 according to an exemplary embodiment may be implemented in various forms.

View (a) of FIG. 45 is a view illustrating a flexible display apparatus 100 of a 3-dimensional structure rather than a flat panel structure. Referring to view (a) of FIG. 45, a display 110 is disposed on one side of the flexible display apparatus 100, and various hardware such as a button, a speaker, a microphone, and an IR lamp are provided on another side.

A whole outer case or a part of the outer case of the flexible display apparatus 100 shown in view (a) of FIG. 45 is made of rubber or other polymer resins, and is flexibly bendable. Accordingly, the whole flexible display apparatus 100 or a part of the flexible display apparatus 100 may have flexibility.

The flexible display apparatus 100 may perform a new operation which is different from a previous operation according to a bending manipulation. For example, the flexible display apparatus 100 normally performs a remote control function to control an external apparatus. When a bending gesture is performed in one area, the flexible display apparatus 100 may perform a calling function. When the remote control function is performed, a remote control button may be displayed on the display 110, and, when the calling function is performed, a dial pad may be displayed on the display 110.

View (b) of FIG. 45 illustrates a circular type flexible display apparatus 100. Accordingly, a visually or functionally different operation may be performed according to a shape in which the flexible display apparatus is placed or folded. For instance, when the flexible display apparatus 100 is placed on a bottom horizontally, photos or other content are displayed, and, when the flexible display apparatus 100 stands on the bottom in an upright position, a clock function is performed. When a center of the flexible display apparatus 100 is bent by 90°, a laptop PC function may be performed. In this case, one of the folded areas displays a soft keyboard and the other area displays a display window.

According to the exemplary embodiments described above, various functions may be performed through the flexible display apparatus or the rubbing manipulation of the flexible apparatus.

Also, the various display methods according to the above-described various exemplary embodiments may be implemented as a program and may be provided to the flexible display apparatus.

For example, a non-transitory computer readable medium, which stores a program for performing sensing a rubbing gesture of rubbing a plurality of different areas on a screen, and, when it is determined that the rubbing gesture is performed, performing an operation corresponding to the rubbing gesture.

Also, a non-transitory computer readable medium, which stores a program for performing various methods for determining an activation area, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible apparatus comprising:
    a flexible display;
    a sensor configured to sense bending of the flexible display; and
    a controller configured to determine the bending of the flexible display based on the sensing of the sensor, determine a rubbing gesture of two areas associated with the bending, and to control the flexible display to perform an operation corresponding to the rubbing gesture, in response to determining the rubbing gesture,
    wherein the rubbing gesture comprises rubbing the two areas associated with the bending of the flexible display while the two areas associated with the bending of the flexible display contact each other.

2. The flexible apparatus as claimed in claim 1, wherein the two areas are divided by the bending.

3. The flexible apparatus as claimed in claim 2, wherein the controller determines the rubbing gesture if a location of the bending is continuously moved during a predetermined time.

4. The flexible apparatus as claimed in claim 2,
    wherein the controller determines the rubbing gesture if a contacted location between the two areas is continuously changed during a predetermined time.

5. The flexible apparatus as claimed in claim 2, wherein the controller is configured to perform a function related to an object displayed on at least one of the two areas in response to determining the rubbing gesture.

6. The flexible apparatus as claimed in claim 5, wherein the function is one of deleting the object displayed on the at least one of the two areas, moving the object to another area and displays the moved object, or copying the object into another area and displays the copied object, in response to determining the rubbing gesture.

7. The flexible apparatus as claimed in claim 5, wherein the function is one of with respect to all content displayed on the screen or all content executed on the screen and with respect to some of the content displayed on the at least one of the two areas or some contents executed in the at least one of the two areas.

8. The flexible apparatus as claimed in claim 5, wherein the controller control the flexible display to provide a feedback effect of the rubbing gesture.

9. The flexible apparatus as claimed in claim 5, further comprising a communicator configured to communicate with an electronic apparatus,
    wherein the controller is further configured to generate a control signal to instruct the electronic apparatus to perform an operation corresponding to the rubbing gesture, and transmits the control signal to the electronic apparatus.

10. A method for controlling of a flexible apparatus, the method comprising:
    sensing bending of a flexible display of the flexible apparatus;
    determining the bending of the flexible display based on a result of the sensing and a rubbing gesture of two areas associated with the bending; and
    performing an operation corresponding to the rubbing gesture, in response to determining the rubbing gesture,
    wherein the rubbing gesture comprises rubbing the two areas associated with the bending of the flexible display while the two areas associated with the bending of the flexible display contact each other.

11. The method as claimed in claim 10, wherein the two areas are divided by the bending.

12. The method as claimed in claim 11, wherein the determining comprises determining the rubbing gesture if a location of the bending is continuously moved during a predetermined time.

13. The method as claimed in claim 11, wherein the performing comprises performing the operation related to an object displayed on at least one of the two areas.

14. The method as claimed in claim 13, wherein the performing comprises one of deleting an object displayed on the at least one of the two areas, moving the object to another area and displaying the moved object, or copying the object into another area and displaying the copied object.

15. The method as claimed in claim 13, wherein the operation is one of a function with respect to all content displayed on the screen or all content executed on the screen and a function with respect to some of the content displayed on the at least one of the two areas or some contents executed in the at least one of the plurality of the two areas.

16. The method as claimed in claim 13, wherein the performing comprises providing a feedback effect of the rubbing gesture.

17. The method as claimed in claim 11, further comprising communicating with an electronic apparatus,
wherein the performing comprises generating a control signal to instruct the electronic apparatus to perform an operation corresponding to the rubbing gesture, and transmitting the control signal to the electronic apparatus.

18. The method as claimed in claim 10, wherein the determining comprises determining the rubbing gesture if a contact area contacted location between the two areas is continuously changed during a predetermined time.

19. A flexible display apparatus comprising:
a sensor configured to sense a deformation of the flexible display apparatus; and
a controller configured to determine the deformation of the flexible display apparatus based on the sensing of the sensor, determine whether the deformation corresponds to a rubbing deformation of the flexible display apparatus, and perform a function corresponding to the rubbing deformation in response to determining that the deformation corresponds to the rubbing deformation,
wherein the rubbing deformation comprises rubbing areas associated with the deformation of the flexible display while the two areas associated with the bending of the flexible display contact each other.

20. The flexible display apparatus of claim 19, wherein the rubbing deformation is a deformation in which areas of the flexible display apparatus contact each other for a predetermined period of time.

21. The flexible display apparatus of claim 20, wherein the areas of the flexible display apparatus change the contact during the predetermined period of time.

22. The flexible display apparatus of claim 21, wherein the areas of the flexible display apparatus continuously change the contact during the predetermined period of time.

23. The flexible display apparatus of claim 20, wherein the contact oscillates between the areas during the predetermined period of time.

24. The flexible display apparatus of claim 20, wherein the contact between the areas during the predetermined period of time corresponds to a rubbing pattern.

25. The flexible display apparatus of claim 19, wherein the rubbing deformation is a deformation in which the flexible display apparatus is deformed along a bending line of the deformation.

26. The flexible display apparatus of claim 25, wherein a position of the bending line is varied during a predetermined period of time.

27. The flexible display apparatus of claim 26, wherein the position of the bending line is continuously varied during the predetermined period of time.

28. The flexible display apparatus of claim 26, wherein the position of the bending line oscillates during the predetermined period of time.

29. The flexible display apparatus of claim 28, wherein the position of the bending line oscillates between a first position of the bending line and a second position of the bending line.

30. The flexible display apparatus of claim 19, further comprising:
a flexible display.

31. The flexible display apparatus of claim 30, wherein the controller is further configured to control the flexible display to perform a display function corresponding to the rubbing deformation in response to determining that the deformation corresponds to the rubbing deformation.

32. The flexible display apparatus of claim 19, wherein the function is a transmission of a control signal to an external apparatus that instructs the external apparatus to perform a function of the external apparatus.

* * * * *